US007983304B2

(12) United States Patent
Tatsuta et al.

(10) Patent No.: US 7,983,304 B2
(45) Date of Patent: Jul. 19, 2011

(54) COMMUNICATION SYSTEM PROVIDED WITH TRANSMITTER FOR TRANSMITTING AUDIO CONTENTS USING PACKET FRAME OF AUDIO DATA

(75) Inventors: Akihiro Tatsuta, Kyoto (JP); Makoto Funabiki, Osaka (JP); Hiroshi Ohue, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/511,628

(22) Filed: Jul. 29, 2009

(65) Prior Publication Data

US 2009/0290600 A1 Nov. 26, 2009

Related U.S. Application Data

(63) Continuation of application No. PCT/JP2008/000999, filed on Apr. 16, 2008.

(30) Foreign Application Priority Data

Apr. 17, 2007 (JP) ................................ 2007-107889

(51) Int. Cl.
*H04J 3/00* (2006.01)
*H04J 3/12* (2006.01)
*G04L 19/00* (2006.01)
*G04L 21/04* (2006.01)

(52) U.S. Cl. ......... 370/476; 370/522; 704/500; 704/503

(58) Field of Classification Search ........................ None
See application file for complete search history.

(56) References Cited

U.S. PATENT DOCUMENTS

| | | | | |
|---|---|---|---|---|
| 6,680,753 | B2 * | 1/2004 | Kahn | 348/512 |
| 6,697,432 | B2 | 2/2004 | Yanagihara et al. | |
| 6,904,403 | B1 * | 6/2005 | Muraki et al. | 704/212 |
| 6,914,637 | B1 | 7/2005 | Wolf et al. | |
| 7,050,455 | B2 | 5/2006 | Nishihara | |
| 7,088,398 | B1 | 8/2006 | Wolf et al. | |
| 7,113,906 | B2 * | 9/2006 | Ohtake et al. | 704/201 |
| 2002/0016852 | A1 | 2/2002 | Nishihara | |
| 2002/0059061 | A1 | 5/2002 | Ohtake et al. | |
| 2003/0048851 | A1 | 3/2003 | Hwang et al. | |
| 2003/0048852 | A1 | 3/2003 | Hwang et al. | |
| 2003/0053548 | A1 * | 3/2003 | Lee et al. | 375/259 |

(Continued)

FOREIGN PATENT DOCUMENTS

EP 1 087 557 3/2001

(Continued)

OTHER PUBLICATIONS

International Search Report issued Jul. 22, 2008 in the International (PCT) Application No. PCT/JP2008/000999.

(Continued)

*Primary Examiner* — Xavier Szewai Wong
(74) *Attorney, Agent, or Firm* — Wenderoth, Lind & Ponack, L.L.P.

(57) ABSTRACT

An audio frame format includes a channel field indicating a number of audio multi-channels, an ignore bit indicating whether or not an audio sample is present in a predetermined region of a packet format, and an A channel audio sample field for transmitting the audio sample. Further, the audio frame format includes a B channel audio sample field for transmitting the audio sample, and a payload of the packet that includes a repetition of an audio frame.

5 Claims, 12 Drawing Sheets

U.S. PATENT DOCUMENTS

| | | | | |
|---|---|---|---|---|
| 2003/0133509 | A1 | 7/2003 | Yanagihara et al. | |
| 2003/0142232 | A1* | 7/2003 | Albean | 348/512 |
| 2004/0080671 | A1 | 4/2004 | Siemens et al. | |
| 2004/0228345 | A1* | 11/2004 | Cho et al. | 370/395.1 |
| 2005/0220193 | A1 | 10/2005 | Ichimura | |
| 2005/0254382 | A1* | 11/2005 | Reiter | 369/53.21 |
| 2006/0120365 | A1 | 6/2006 | Nishihara | |
| 2008/0304810 | A1* | 12/2008 | Rijckaert et al. | 386/68 |
| 2010/0100390 | A1* | 4/2010 | Tanaka | 704/503 |

FOREIGN PATENT DOCUMENTS

| | | | |
|---|---|---|---|
| EP | 1 648 140 | | 4/2006 |
| JP | 1995-182788 | A * | 7/1995 |
| JP | 10-51737 | | 2/1998 |
| JP | 11-7724 | | 1/1999 |
| JP | 2001-144694 | | 5/2001 |
| JP | 2001-168880 | | 6/2001 |
| JP | 2001-308923 | | 11/2001 |
| JP | 2005-514836 | | 5/2005 |
| JP | 2005-295394 | | 10/2005 |
| WO | 03/058376 | | 7/2003 |
| WO | 2007/040085 | | 4/2007 |

OTHER PUBLICATIONS

High-Definition Multimedia Interface, Specification Version 1.3a, Nov. 10, 2006.

Supplemental Search Report dated Apr. 16, 2010 issued in corresponding EP Application No. 10150125.

Supplemental Search Report dated Apr. 16, 2010 issued in corresponding EP Application No. 08738601.

Notification Concerning Transmittal of International Preliminary Report on Patentability for PCT/JP2008/000999, partially translated, Notification mailed Oct. 29, 2009, International Preliminary Report issued Oct. 20, 2009.

Notification of Transmittal of Translation of the International Preliminary Report for PCT/JP2008/000999, mailed Nov. 19, 2009, Translation of the International Preliminary Report issued Nov. 10, 2009.

* cited by examiner

*Fig.8*

AUDIO SUB-PACKET

| | | | |
|---|---|---|---|
| 8 OCTETS | 8 OCTETS | ··· | 8 OCTETS |
| AUDIO FRAME 1 | AUDIO FRAME 2 | ··· | AUDIO FRAME n |

Fig.9

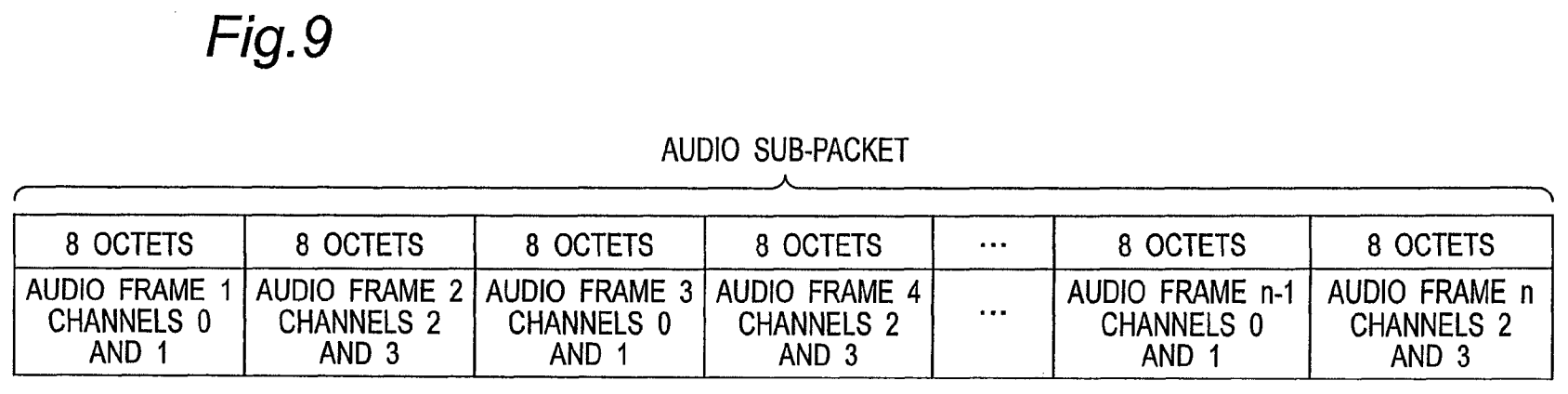

AUDIO SUB-PACKET

| 8 OCTETS | 8 OCTETS | 8 OCTETS | 8 OCTETS | ... | 8 OCTETS | 8 OCTETS |
|---|---|---|---|---|---|---|
| AUDIO FRAME 1 CHANNELS 0 AND 1 | AUDIO FRAME 2 CHANNELS 2 AND 3 | AUDIO FRAME 3 CHANNELS 0 AND 1 | AUDIO FRAME 4 CHANNELS 2 AND 3 | ... | AUDIO FRAME n-1 CHANNELS 0 AND 1 | AUDIO FRAME n CHANNELS 2 AND 3 |

*Fig. 10*

AUDIO FRAME

| 8 BITS | 28 BITS | 28 BITS |
|---|---|---|
| AUDIO HEADER FIELD | L CHANNEL AUDIO DATA FIELD | R CHANNEL AUDIO DATA FIELD |

*Fig. 11*

AUDIO HEADER FIELD

| 2 BITS | 1 BIT | 1 BIT | 1 BIT | 3 BITS |
|---|---|---|---|---|
| CHANNEL FIELD | RESERVED BIT | BEGINNING BIT | IGNORE BIT | AUDIO DATA CONTENT ID |

*Fig. 12*

| L CHANNEL AUDIO DATA FIELD | | R CHANNEL AUDIO DATA FIELD | |
|---|---|---|---|
| 24 BITS | 4 BITS | 24 BITS | 4 BITS |
| L CHANNEL AUDIO SAMPLE FIELD | L CHANNEL STATUS FIELD | R CHANNEL AUDIO SAMPLE FIELD | R CHANNEL STATUS FIELD |

*Fig. 13*

L CHANNEL STATUS FIELD

| 1 BIT | 1 BIT | 1 BIT | 1 BIT |
|---|---|---|---|
| $V_L$ | $U_L$ | $C_L$ | $P_L$ |

*Fig. 14*

R CHANNEL STATUS FIELD

| 1 BIT | 1 BIT | 1 BIT | 1 BIT |
|---|---|---|---|
| $V_R$ | $U_R$ | $C_R$ | $P_R$ |

*Fig. 15*

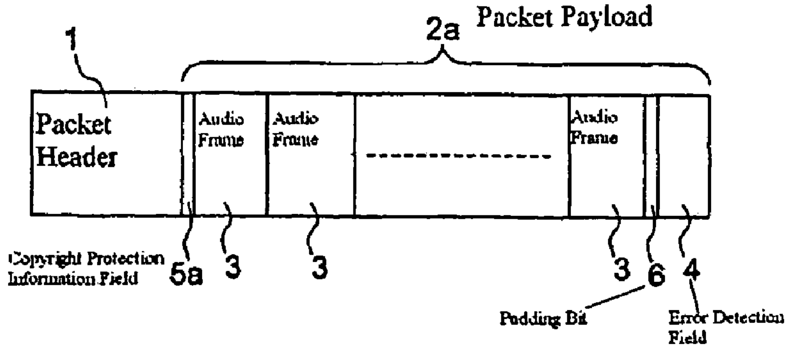

Fig. 16

COPYRIGHT PROTECTION INFORMATION FIELD 5A

| 1 BIT | 1 BIT | 6 BITS | 8 BITS |
|---|---|---|---|
| RESERVED BIT | TYPE BIT | SEQUENCE NUMBER FIELD | DATA FIELD |

Fig. 17

| SEQUENCE NUMBER FIELD VALUE | DATA FIELD CONTENTS |
|---|---|
| 0x00 | ACP HEADER FIELD |
| 0x01 | DATA OF OCTET 0 |
| 0x02 | DATA OF OCTET 1 |
| 0x03-0x0F | DATA OF OCTET 2 TO OCTET 14 |
| 0x10 | DATA OF OCTET 15 |

Fig. 18

| OCTET \ BIT NUMBER | 7 | 6 | 5-3 | 2 | 1-0 |
|---|---|---|---|---|---|
| DATA OF OCTET 0 | RESERVED BIT | RETENTION MOVE MODE BIT | RETENTION STATE BITS | EPN BIT | DTCP CCI FIELD |
| DATA OF OCTET 1 TO OCTET 15 | RESERVED FIELD | | | | |

Fig. 19

| OCTET \ BIT NUMBER | 7 | 6 | 5 | 4 | 3 | 2 | 1 | 0 |
|---|---|---|---|---|---|---|---|---|
| DATA OF OCTET 0 TO OCTET 15 | RESERVED FIELD | | | | | | | |

Fig. 20

| OCTET \ BIT NUMBER | 7 | 6 | 5 | 4 | 3 | 2 | 1 | 0 |
|---|---|---|---|---|---|---|---|---|
| DATA OF OCTET 0 | DVD AUDIO TYPE DEPENDENT GENERATION FIELD | | | | | | | |
| DATA OF OCTET 1 | COPY PERMISSION FIELD | COPY NUMBER FIELD | | | QUALITY IELD | | | TRANSACTION BIT |
| DATA OF OCTET 2 TO OCTET 15 | RESERVED FIELD | | | | | | | |

*Fig.21*

| OCTET \ BIT NUMBER | 7 | 6 | 5 | 4 | 3 | 2 | 1 | 0 |
|---|---|---|---|---|---|---|---|---|
| DATA OF OCTET 0 TO OCTET 15 | CCI_1 FIELD | | | | | | | |

*Fig.22*

| SEQUENCE NUMBER FIELD VALUE | DATA FIELD CONTENTS |
|---|---|
| 0x00 | ISRC HEADER FIELD |
| 0x01 | DATA OF OCTET 0 |
| 0x02 | DATA OF OCTET 1 |
| 0x03-0x0F | DATA OF OCTET 2 TO OCTET 30 |
| 0x10 | DATA OF OCTET 31 |

*Fig.23*

ISRC HEADER FIELD

| 1 BIT | 1 BIT | 3 BITS | 3 BITS |
|---|---|---|---|
| COUNT BIT | VALID BIT | RESERVED BITS | ISRC STATUS BITS |

*Fig.24*

| OCTET \ BIT NUMBER | 7 | 6 | 5 | 4 | 3 | 2 | 1 | 0 |
|---|---|---|---|---|---|---|---|---|
| DATA OF OCTET 0 | UPC_EAN_ISRC_0 FIELD | | | | | | | |
| DATA OF OCTET 1 | UPC_EAN_ISRC_1 FIELD | | | | | | | |
| DATA OF OCTET 2 TO OCTET 31 | UPC_EAN_ISRC_2 FIELD TO UPC_EAN_ISRC_31 FIELD | | | | | | | |

COMMUNICATION SYSTEM PROVIDED WITH TRANSMITTER FOR TRANSMITTING AUDIO CONTENTS USING PACKET FRAME OF AUDIO DATA

This is a continuation application of International application No. PCT/JP2008/000999, filed on Apr. 16, 2008.

BACKGROUND OF THE INVENTION

1. Field of the Invention

The present invention relates to a packet format of audio data for transmitting digital audio data in real time and a communication system using the same packet format, in particular to a packet format of audio data transmitted between audio and visual devices (referred to as AV devices hereinafter) and a communication system using the same packet format.

2. Description of the Related Art

AV devices adopting an HDMI (High Definition Multimedia Interface) have been in widespread use in the market. In this case, the HDMI is an interface standard for next-generation digital televisions for transmitting an uncompressed baseband video signal and a digital audio signal via one wired transmission cable. Conventionally, it has been required to use a plurality of cables for respective signals such as a video signal and an audio signal, in order to connect a plurality of AV devices to each other. However, since only one cable connection is required in the HDMI, there is such an advantageous effect that a quite simple wiring can be provided. In addition, since data are transmitted digitally in the HDMI, there is such an advantageous effect that data transmission with large noise resistance and high image quality can be provided. Further, since control signals can be transmitted bi-directionally, it is possible to control a television set and a DVD player so as to cooperate with each other, or it is possible to construct a home theater by a surround loudspeaker and a large-screen display and control an entire system of the home theater. In the HDMI, since high quality contents can be transmitted, an HDCP (High-bandwidth Digital Content Protection System) is used as a content protection method for preventing illegal use and illegal copying of provided contents. In the HDCP, there are defined device authentications at a transmitter side and a receiver side, a key sharing system for the authentications, and an encrypting method for the contents to be transmitted.

FIG. 25 is a diagram showing data of audio packets for use in a communication system according to a prior art and compliant with the HDMI. Referring to FIG. 25, an operation for transmitting an audio data packet will be described below.

Referring to FIG. 25, an audio packet includes a packet header 71 of audio data and a packet payload 72 of the audio data. In this case, the packet header 71 includes a layout bit 73, a sample present field 74, a B field 75 and a sample flat field 76. In addition, the packet payload 72 of the audio data includes L channel sample data 77*a* to 77*d*, R channel sample data 78*a* to 78*d*, R channel status fields 79*a* to 79*d*, and L channel status fields 80*a* to 80*d*.

Transmission using the packet format of the audio data configured as described above will now be described.

A source device and a sink device are connected to each other via an HDMI cable, and video data is transmitted from the source device to the sink device. In addition, the audio data is time-division multiplexed, and thereafter, transmitted during the blanking intervals of the video data. Each packet of the audio data includes the packet header 71 and the packet payload 72. The packet header 71 includes the layout bit 73, the sample present field 74, the B field 75, and the sample flat field 76. In addition, the packet payload 72 includes the L channel sample data 77*a* to 77*d*, the R channel sample data 78*a* to 78*d*, the R channel status fields 79*a* to 79*d*, and the L channel status fields 80*a* to 80*d*. In this case, the layout bit 73 represents a configuration of audio samples included in the payload 72 of the packet. In addition, the sample present field 74 represents whether or not an audio sample is included in a predetermined position of the packet payload, the B field 75 represents whether or not a first frame compliant with an IEC60958 Standard (in this case, IEC is an abbreviation of International Electrotechnical Commission) is included, and the sample flat field 76 represents whether or not the audio sample is a flat line sample.

First of all, such a case is described below where the layout bit 73 is 0. In this case, audio samples for up to two channels are allocated in total to the L channel sample data 77*a* to 77*d* and the R channel sample data 78*a* to 78*d*

TABLE 1

| |
|---|
| L channel sample data 77a = Audio sample 0 for channel 1; |
| L channel sample data 77b = Audio sample 1 for channel 1; |
| L channel sample data 77c = Audio sample 2 for channel 1; and |
| L channel sample data 77d = Audio sample 3 for channel 1. |
| R channel sample data 78a = Audio sample 0 for channel 2; |
| R channel sample data 78b = Audio sample 1 for channel 2; |
| R channel sample data 78c = Audio sample 2 for channel 2; and |
| R channel sample data 78d = Audio sample 3 for channel 2. |

In addition, the R channel statuses 79*a* to 79*d* and the L channel statuses 80*a* to 80*d* are related to the R channel sample data 78*a* to 78*d* and the L channel sample data 77*a* to 77*d*, respectively, and each of the R channel statuses 79*a* to 79*d* and the L channel statuses 80*a* to 80*d* includes a V (valid bit), an U (User Data bit), a C (Channel Status), and a P (Parity) compliant with the IEC60958 Standard.

Next, such a case is described below where the layout bit 73 is 1. In this case, audio samples for up to eight channels are allocated in total to the L channel sample data 77*a* to 77*d* and the R channel sample data 78*a* to 78*d*.

TABLE 2

| |
|---|
| L channel sample data 77a = Audio sample 0 for channel 1; |
| L channel sample data 77b = Audio sample 0 for channel 3; |
| L channel sample data 77c = Audio sample 0 for channel 5; and |
| L channel sample data 77d = Audio sample 0 for channel 7. |
| R channel sample data 78a = Audio sample 0 for channel 2; |
| R channel sample data 78b = Audio sample 0 for channel 4; |
| R channel sample data 78c = Audio sample 0 for channel 6; and |
| R channel sample data 78d = Audio sample 0 for channel 8. |

By using the above-mentioned packets of audio data, the digital audio data can be transmitted from the source device to the sink device in real time. For example, the audio data packet is shown in the following Patent Document 1 and Non-Patent Document 1.

Patent Document 1: Japanese patent laid-open publication No. JP-2005-295394-A.

Non-Patent Document 1: High-Definition Multimedia Interface Specification Version 1.3a, 2006 Nov. 10.

AUDIO SPECIFICATIONS, Version 1.0, Annex B", DVD Forum, March 1999.

BRIEF SUMMARY OF THE INVENTION

However, the above-mentioned packet format of the audio data has the following problems. The eight audio samples are allocated to the payload 72 of each of the packets, and therefore, when the number of multi-channels of the digital audio data is six (for example, 5.1 channel surround), useless free space will be generated. In addition, as for the size of the packet format, the size of the header 71 of the packet is 24 bits, the size of the payload 72 of the packet is 224 bits, and a total size the packet is 248 bits. For example, when the audio data is encrypted and transmitted, since the size of the packet is not a natural number multiple of 128 bits or 64 bits, which is a unit of the encryption, inefficient bit padding process will be required.

In light of the above-mentioned problems, the present invention is related to real-time transmission of digital audio data, and it is an object of the present invention to provide a packet format of audio data capable of encrypting an audio data stream for multi-channels and transmitting the encrypted audio data stream efficiently.

According to a first aspect of the invention, there is provided a communication system having transmission means for transmitting at least audio contents from a source device to a sink device using an audio frame formed in a predetermined packet format of audio data. The audio frame formed in the packet format of the audio data includes:

(a) a channel field indicating a number of audio multi-channels;

(b) an ignore bit indicating whether or not an audio sample is present in a predetermined region of the packet format;

(c) a beginning bit indicating whether or not the audio sample is a beginning frame compliant with an IEC (International Electrotechnical Commission) 60958 Standard;

(d) an L channel audio sample field for transmitting the audio sample;

(e) an L channel status field for transmitting status information compliant with the IEC 60958 Standard and related to the L channel audio sample field;

(f) an R channel audio sample field for transmitting the audio sample; and (g) an R channel status field for transmitting status information compliant with the IEC 60958 Standard and related to the R channel audio sample field. A payload of the packet includes a repetition of the audio frame.

In the above-mentioned communication system continuous packets are preferably arranged so that positions of beginning frames in payloads of the continuous packets are different from each other.

In addition, in the above-mentioned communication system, the audio frame formed in the packet format of the audio data preferably further includes an audio data contents identifier field indicating a type of the audio contents.

Further in the above-mentioned communication system, the payload of the packet preferably further includes a copyright protection information field indicating information on copyright protection of the audio contents.

According to a second aspect of the invention, there is provided a communication system having transmission means for transmitting at least audio contents from a source device to a sink device using an audio frame formed in a predetermined packet format of audio data. The audio frame formed in the packet format of the audio data includes:

(a) a channel field indicating a number of audio multi-channels in the packet format for transmitting audio;

(b) an ignore bit indicating whether or not an audio sample is present in a predetermined region of the packet format;

(c) an A channel audio sample field for transmitting the audio sample; and (d) a B channel audio sample field for transmitting the audio sample. A payload of the packet includes a repetition of the audio frame.

According to a third aspect of the present invention, there is provided a packet format of audio data for use in a communication system for transmitting at least audio contents from a source device to a sink device. An audio frame formed in the packet format of the audio data includes:

(a) a channel field indicating a number of audio multi-channels;

(b) an ignore bit indicating whether or not an audio sample is present in a predetermined region of the packet format;

(c) a beginning bit indicating whether or not the audio sample is a beginning frame compliant with an IEC (International Electrotechnical Commission) 60958 Standard;

(d) an L channel audio sample field for transmitting the audio sample;

(e) an L channel status field for transmitting status information compliant with the IEC 60958 Standard and related to the L channel audio sample field;

(f) an R channel audio sample field for transmitting the audio sample; and (g) an R channel status field for transmitting status information compliant with the IEC 60958 Standard and related to the R channel audio sample field. A payload of the packet includes a repetition of the audio frame.

In the above-mentioned packet format of the audio data, continuous packets are preferably arranged so that positions of beginning frames in payloads of the continuous packets are different from each other.

In addition, in the above-mentioned packet format of the audio data the audio frame formed in the packet format of the audio data preferably further includes an audio data contents identifier field indicating a type of the audio contents.

Further, in the above-mentioned packet format of the audio data the payload of the packet preferably further includes a copyright protection information field indicating information on copyright protection of the audio contents.

According to a fourth aspect of the present invention, there is provided a packet format of audio data for use in a communication system for transmitting at least audio contents from a source device to a sink device. An audio frame formed in the packet format of the audio data includes:

(a) a channel field indicating a number of audio multi-channels in the packet format for transmitting audio;

(b) an ignore bit indicating whether or not an audio sample is present in a predetermined region of the packet format;

(c) an A channel audio sample field for transmitting the audio sample; and (d) a B channel audio sample field for transmitting the audio sample. A payload of the packet includes a repetition of the audio frame.

The communication system and the packet format for audio data according to the present invention, the audio frame formed in the packet format of the audio data includes a channel field indicating a number of audio multi-channels, an ignore bit indicating whether or not an audio sample is present in a predetermined region of the packet format, a beginning bit indicating whether or not the audio sample is a beginning frame compliant with an IEC (International Electrotechnical Commission) 60958 Standard, an L channel audio sample field for transmitting the audio sample, an L channel status field for transmitting status information compliant with the IEC 60958 Standard and related to the L channel audio sample field, an R channel audio sample field for transmitting the audio sample, and an R channel status field for transmitting status information compliant with the IEC 60958 Standard and related to the R channel audio sample field. In addition, a payload of the packet includes a repetition of the audio frame. In addition, by configuring the audio frame so as to transmit digital audio data for two channels and setting the size of the audio frame to a natural number fraction of 128 bits or 64 bits, which is the unit of the encryption, it is possible to encrypt an audio data stream for multi-channels and transmit the encrypted audio data stream efficiently.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 8 is a diagram showing a configuration of an audio sub-packet in a payload of a packet of audio data used in the wireless communication system according to the fourth embodiment.

FIG. 9 is a diagram showing an example of ordering of channels in the audio sub-packet of FIG. 8.

FIG. 10 is a diagram showing a frame format of each audio frame of FIG. 8.

FIG. 11 is a diagram showing a format of an audio header field of FIG. 10.

FIG. 12 is a diagram showing a format of an L channel audio data field and an R channel audio data field.

FIG. 13 is a diagram showing a format of an L channel status field of FIG. 12.

FIG. 14 is a diagram showing a format of an R channel status field of FIG. 12.

FIG. 15 is a diagram showing a packet format of audio data for use in a wireless communication system according to a fifth embodiment.

FIG. 16 is a diagram showing a format of a copyright protection information field 5*a* of FIG. 15.

FIG. 17 is a diagram showing a format of an ACP packet when a type bit of FIG. 16 indicates the ACP packet.

FIG. 18 is a diagram showing a format of a data field of the ACP packet when a value of an ACP header field of FIG. 17 is set to 0x00, which indicates that an audio type is generic audio.

FIG. 19 is a diagram showing a format of the data field of the ACP packet when the value of the ACP header field of FIG. 17 is 0x01, which indicates that the audio type is IEC60958 Standard identified audio.

FIG. 20 is a diagram showing a format of the data field of the ACP packet when the value of the ACP header field of FIG. 17 is 0x02, which indicates that the audio type is DVD audio.

FIG. 21 is a diagram showing a format of the data field of the ACP packet when the value of the ACP header field of FIG. 17 is 0x03, which indicates that the audio type is super audio CD.

FIG. 22 is a diagram showing a format of an ISRC packet when the type bit of FIG. 16 indicates the ISRC packet.

FIG. 23 is a diagram showing a format of an ISRC header field of FIG. 22 when the type bit of FIG. 16 indicates the ISRC packet.

FIG. 24 is a diagram showing a format of a data field of the ISRC packet when the type bit of FIG. 16 indicates the ISRC packet.

Figure 1:
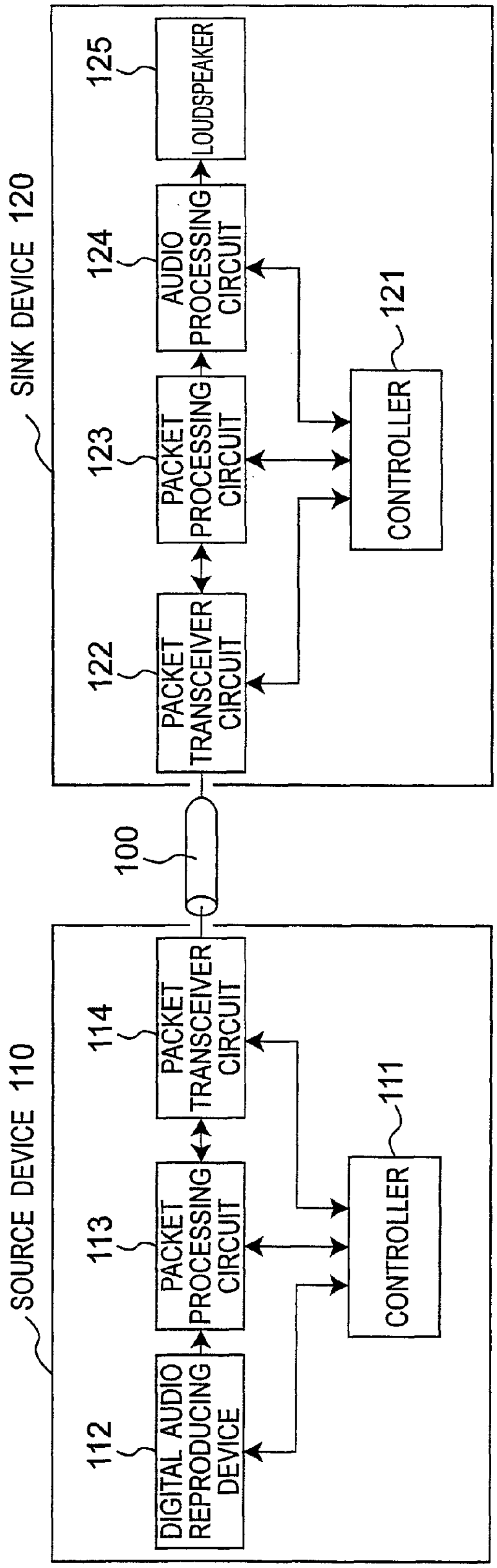
FIG. 1 is a block diagram showing a configuration of a communication system for transmitting a packet signal of audio data using a packet format of audio data according to a first embodiment of the present invention.

| DESCRIPTION OF REFERENCE SYMBOLS | |
|---|---|
| 1 | Packet header, |
| 2 and 2a | Packet payload, |
| 3 and 3a | Audio frame, |
| 4 | Error detection field, |
| 5 | Copyright protection information bit, |
| 5a | Copyright protection information field, |
| 6 | Padding bit, |
| 11 | Channel field, |
| 12 | Beginning bit, |
| 13 | Ignore bit, |
| 14 | L channel audio sample field, |
| 15 | L channel status field, |
| 16 | R channel audio sample field, |
| 17 | R channel status field, |
| 18, 18a, and 18b | Reserved field, |
| 19 and 19a | Audio header field, |
| 30a to 30n | Audio packet, |
| 31a to 31n | Packet header, |
| 32a to 32n | Packet payload, |
| 33a to 33n | First audio frame, |
| 34a to 34n | Second audio frame, |
| 35a to 35n | Third audio frame, |
| 36a to 36n | Mth audio frame, |
| 37a to 37n | Error detection field, |
| 38a to 38n | Copyright protection information bit, |
| 39a to 39n | Padding bit, |
| 41 | Channel field, |
| 42 | Ignore bit, |
| 43 | A channel audio sample field, |
| 44 | B channel audio sample field, |
| 45 | Reserved bit, |
| 100 | Signal transmission cable, |
| 110, 110A | Source device, |
| 111 | Controller, |
| 112 | Digital audio reproducing device, |
| 113 | Packet processing circuit, |
| 114 | Packet transceiver circuit, |
| 115, 126 | Wireless communication circuit, |
| 116 and 127 | Antenna, |
| 120 and 120A | Sink device, |
| 121 | Controller, |
| 122 | Packet transceiver circuit, |
| 123 | Packet processing circuit, |
| 124 | Audio processing circuit, and |
| 125 | Loudspeaker. |

DETAILED DESCRIPTION OF THE INVENTION

Embodiment of the present invention will be described hereinafter with reference to the drawings. In the embodiment, components similar to each other are denoted by the same reference numerals.

First Embodiment

Figure 2:
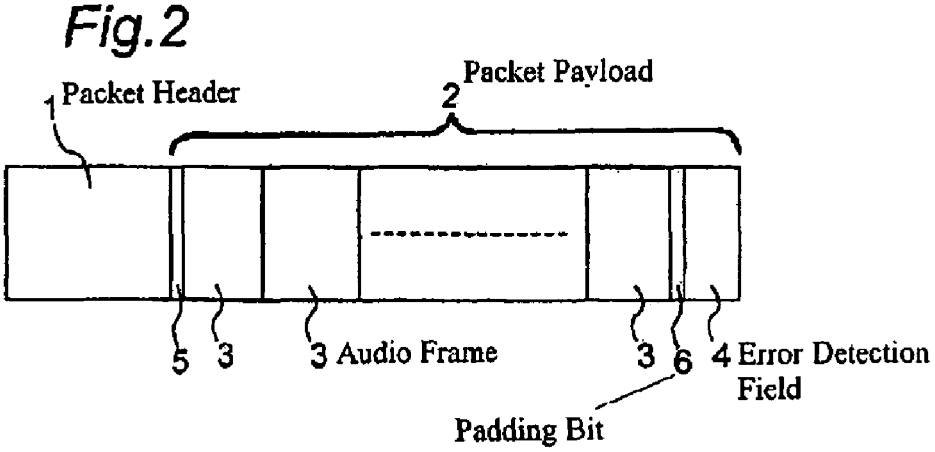
FIG. 2 is a diagram showing the packet format of the audio data for use in the communication system according to the first embodiment shown in FIG. 1.
Figure 3:
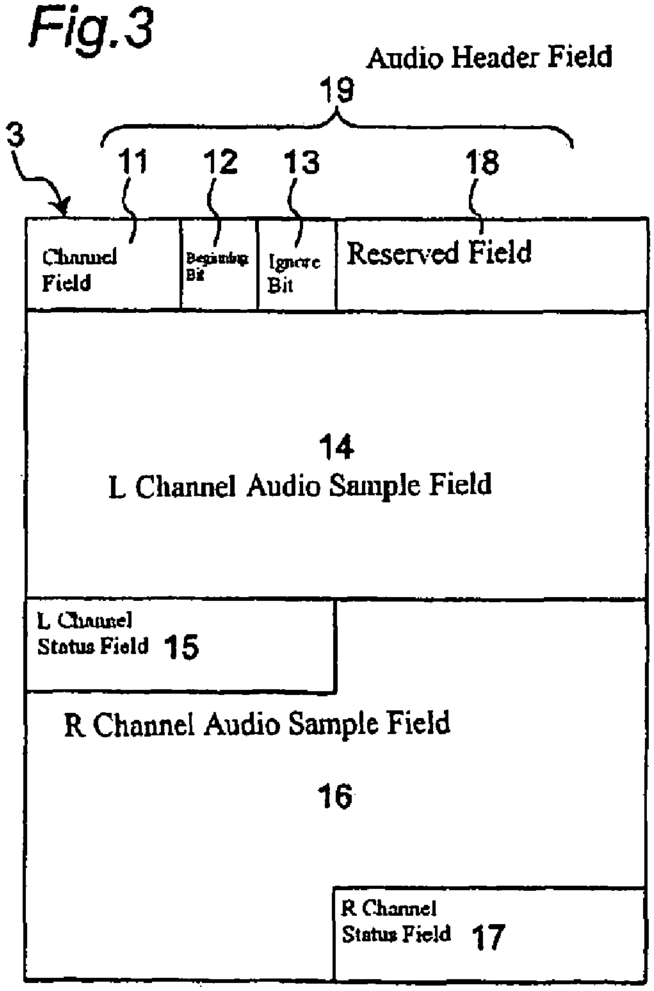
FIG. 3 is a diagram showing an audio frame format for use in the communication system according to the first embodiment shown in FIG. 1.

FIG. 1 is a block diagram showing a configuration of a communication system for transmitting a packet signal of audio data using a packet format of audio data according to a first embodiment of the present invention. FIG. 2 is a diagram showing the packet format of the audio data for use in the communication system according to the first embodiment shown in FIG. 1. FIG. 3 is a diagram showing an audio frame format for use in the communication system according to the first embodiment shown in FIG. 1. It is to be noted that configurations of a source device 110 and a sink device 120 shown in FIG. 1 are applied to first to third embodiments and a modified embodiment of the first embodiment.

The packet format of the audio data according to the first embodiment is characterized by including a channel field indicating a number of audio multi-channels, an ignore bit indicating whether or not an audio sample is present in a predetermined region of the packet format, a beginning bit indicating whether or not the audio sample is a beginning frame compliant with an IEC 60958 Standard, an L channel audio sample field for transmitting the audio sample, an L channel status field for transmitting status information compliant with the IEC 60958 Standard and related to the L channel audio sample field, an R channel audio sample field for transmitting the audio sample, and an R channel status field for transmitting status information compliant with the IEC 60958 Standard and related to the R channel audio sample field. In addition, the packet format of the audio data according to the first embodiment is characterized in that a payload of each packet includes a repetition of the audio frame.

In the embodiment shown below, the packet format of the audio data is described, however, the packet format may be configured to transmit a packet signal of video data simultaneously.

First of all, referring to FIG. 1, there will be described a configuration and operation of the communication system including the source device 110 and the sink device 120 connected to each other via a wired transmission cable 100 for a wired network. In the present embodiment, the wired transmission cable 100 for the wired network is used. However, the present invention is not limited to this, and the source device 110 may be connected to the sink device 120 using a wireless communication link for a wireless network.

Referring to FIG. 1, the source device 110 is configured to include a digital audio reproducing device 112, a packet processing circuit 113, a packet transceiver circuit 114, and a controller 111 for controlling operations performed by these devices or circuits 112 to 114. The digital audio reproducing device 112, which is a digital music player, for example, reproduces audio data from a recording medium such as a memory, an MD or a DVD, and outputs the reproduced audio data to the packet processing circuit 113. The packet processing circuit 113 converts the inputted audio data into a digital signal formed in a predetermined packet format, and outputs the digital signal to the packet transceiver circuit 114. The packet transceiver circuit 114 digitally modulates a carrier signal according to the inputted digital signal, and transmits a digital data signal after the modulation to a packet transceiver circuit 122 of the sink device 120 via the wired transmission cable 100. A digital data signal transmitted from the sink device 120 is inputted to the packet transceiver circuit 114, and the packet transceiver circuit 114 demodulates the digital data signal to a digital signal, and outputs the digital signal to the packet processing circuit 113. The packet processing circuit 113 extracts only predetermined control commands from the inputted digital signal by a predetermined packet separation process, and outputs the predetermined control commands to the controller 111.

The sink device 120 is configured to include the packet transceiver circuit 122, a packet processing circuit 123, an audio processing circuit 124, a loudspeaker 125, and a controller 121 for controlling operations performed by these circuits 122 to 124 or the like. The packet transceiver circuit 122 demodulates the received digital data signal to a digital signal, and outputs the digital signal to the packet processing circuit 123. The packet processing circuit 123 extracts only audio data and predetermined control commands from the inputted digital signal by a predetermined packet separation process. The packet processing circuit 123 outputs the former data to the audio processing circuit 124, and outputs the latter control commands to the controller 121. The audio processing circuit 124 performs a predetermined signal process and a D/A conversion process on the inputted audio data, and outputs the resultant audio signal to the loudspeaker 125 to output voice.

In the communication system of FIG. 1, for example, when a number of errors of the audio data signal received by the sink device 120 exceeds a predetermined threshold value, the packet transceiver circuit 122 transmits a control packet signal including an instruction command to instruct the source device 110 to retransmit an audio packet, to the packet transceiver circuit 114 of the source device 110.

Referring to FIG. 2 showing the packet format of the audio data for use in the communication system of FIG. 1, one packet includes a packet header 1 and a packet payload 2. In this case, the packet payload 2 includes a copyright protection information bit 5, a plurality of audio frames 3, a padding bit 6, and an error detection field 4.

Referring to FIG. 3 showing each audio frame of the audio data for use in the communication system of FIG. 1, each audio frame includes an audio header field 19, an L channel audio sample field 14, an L channel status field 15, an R channel audio sample field 16, and an R channel status field 17. In addition, the audio header field 19 includes a channel field 11 indicating the number of multi-channels, a beginning frame bit 12 compliant with the IEC60958 Standard, an ignore bit (also referred to as a sample present bit) 13, and a reserved field 18.

Referring to FIGS. 1 to 3, transmission of audio data using the packet format of the audio data in the communication system configured as described above will be described below.

First of all, an operation performed by the source device 110 will be described. Referring to FIG. 1, the digital audio reproducing device 112 reproduces a digital audio data stream from, for example, a recording medium, and outputs the reproduced digital audio data stream to the packet processing circuit 113. The packet processing circuit 23 temporarily stores the inputted audio data in a buffer included therein, and generates the audio packet of FIG. 2.

In this case, the audio packet includes (a) the packet header 1 for storing therein information on an MAC layer and a PHY layer such as a destination address and a packet length, and (b) the packet payload 2 for storing therein audio sample data and the like. In this case, the packet payload 2 includes the copyright protection information bit 5, a repetition pattern of the audio frames 3 (having a size of a natural number multiple of the size of the audio frame), and the padding bit 6. The error detection field 4 is added to the tail of the packet payload 2, subsequent to the end of the respective audio frames 3 and the padding bit 6. In this case, information on copyright protection of audio contents stored in the packet payload 2 is set to the copyright protection information bit 5. In addition, a length of the padding bit 6 is set so as to adjust a length of the packet payload 2 so that a total length of the copyright protection information bit 5 and the repetition pattern of the audio frames 3 is equal to a natural number multiple of an encryption process unit. An error detection bit is set to the error detection field 4 so that errors of the packet payload 2 can be detected.

As shown in FIG. 3, the audio frame 3 includes (a) the channel field 11 (2 bits) indicating the number of multi-channels of audio data to be transmitted, (b) the beginning bit 12 (1 bit) indicating whether or not an audio sample is a beginning frame compliant with the IEC60958 Standard, (c) the ignore bit 13 (1 bit) indicating whether or not the audio sample is present in a predetermined region of the frame format, (d) the L channel audio sample field 14 (24 bits), (e) the L channel status field 15 (4 bits) for transmitting status information compliant with the IEC60958 Standard and related to the L channel audio sample, (f) the R channel audio sample field 16 (24 bits), (g) the R channel status field 17 (4 bits) for transmitting status information compliant with the IEC 60958 and related to the R channel audio sample, and (h) the reserved field 18 (4 bits).

The packet transceiver circuit 14 transmits the audio packet generated by the packet processing circuit 113 to the sink device 120 via the wired transmission cable 100. In this case, the wired transmission cable 100 serving as a wired network line is used. However, the present invention is not limited to this, and the audio data may be transmitted using a wireless communication link. In this case, the relationship among the channel field 11 indicating the number of multi-channels, the L channel audio sample field 14 and the R channel audio sample field 16 will be described below.

TABLE 3

| |
|---|
| When channel field 11 = 0 (indicating one-channel audio and two-channel audio), |
| L channel audio sample field 14 = Audio sample 0 for channel 1; |
| R channel audio sample field 16 = Audio sample 0 for channel 2; |
| L channel audio sample field 14 = Audio sample 1 for channel 1; |
| R channel audio sample field 16 = Audio sample 1 for channel 2; |
| L channel audio sample field 14 = Audio sample 2 for channel 1; |
| R channel audio sample field 16 = Audio sample 2 for channel 2; |
| L channel audio sample field 14 = Audio sample 3 for channel 1; |
| R channel audio sample field 16 = Audio sample 3 for channel 2; and |
| Repeated subsequently in a manner similar to the above-mentioned manner. |

TABLE 4

| |
|---|
| When channel field 11 = 1 (indicating three-channel audio and four-channel audio), |
| L channel audio sample field 14 = Audio sample 0 for channel 1; |
| R channel audio sample field 16 = Audio sample 0 for channel 2; |
| L channel audio sample field 14 = Audio sample 0 for channel 3; |
| R channel audio sample field 16 = Audio sample 0 for channel 1; |
| L channel audio sample field 14 = Audio sample 1 for channel 2; |
| R channel audio sample field 16 = Audio sample 1 for channel 4; |

TABLE 4-continued

| |
|---|
| L channel audio sample field 14 = Audio sample 2 for channel 3; |
| R channel audio sample field 16 = Audio sample 2 for channel 4; and |
| Repeated subsequently in a manner similar to the above-mentioned manner. |

TABLE 5

| |
|---|
| When channel field 11 = 2 (indicating five-channel audio and six-channel audio), |
| L channel audio sample field 14 = Audio sample 0 for channel 1; |
| R channel audio sample field 16 = Audio sample 0 for channel 2; |
| L channel audio sample field 14 = Audio sample 0 for channel 3; |
| R channel audio sample field 16 = Audio sample 0 for channel 4; |
| L channel audio sample field 14 = Audio sample 0 for channel 5; |
| R channel audio sample field 16 = Audio sample 0 for channel 6; |
| L channel audio sample field 14 = Audio sample 1 for channel 1; |
| R channel audio sample field 16 = Audio sample 1 for channel 2; and |
| Repeated subsequently in a manner similar to the above-mentioned manner. |

TABLE 6

| |
|---|
| When channel field 11 = 3 (indicating seven-channel audio and eight-channel audio), |
| L channel audio sample field 14 = Audio sample 0 for channel 1; |
| R channel audio sample field 16 = Audio sample 0 for channel 2; |
| L channel audio sample field 14 = Audio sample 0 for channel 3; |
| R channel audio sample field 16 = Audio sample 0 for channel 4; |
| L channel audio sample field 14 = Audio sample 0 for channel 5; |
| R channel audio sample field 16 = Audio sample 0 for channel 6; |
| L channel audio sample field 14 = Audio sample 0 for channel 7; |
| R channel audio sample field 16 = Audio sample 0 for channel 8; and |
| Repeated subsequently. |

The L channel status field 15 and the R channel status field 17 are related to the L channel audio sample data 14 and the R channel audio sample data 16, respectively, and each of the L channel status field 15 and the R channel status field 17 includes a V (Valid bit), an U (User Data bit), a C (Channel Status), and a P (Parity) compliant with the IEC60958 Standard. In addition, the beginning bit 12 represents whether or not the audio frame 3 is a first frame compliant with the IEC60958 Standard, and the ignore bit 13 represents whether or not the audio sample is included in the R channel audio sample field 16. The ignore bit 13 enables such a case to be handled where no audio sample data is present in the last audio frame 3 in the packet payload 2 even when the number of multi-channels of the audio data to be transmitted is odd. In addition, it is also possible to enable such a case to be handled where, when the ignore bit 13 is not present in each audio frame of a sequence of the audio frames, no audio sample data is present not only in the R channel audio sample field 16 but also in the L channel audio sample field 14 in each audio frame other than the first audio frame.

An operation performed by the sink device 120 will next be described. Referring to FIG. 1, the packet transceiver circuit 122 receives the digital data signal including the audio packet (See FIG. 2) received via the wired transmission cable 100, performs a signal process such as demodulation process on the digital data signal, and thereafter, outputs the processed digital data signal to the packet processing circuit 123. The packet processing circuit 123 temporarily stores the inputted audio packet in a build-in buffer, and performs a predetermined packet decoding process according to the information on the MAC layer and the PHY layer included in the packet header 1. Thereafter, the packet processing circuit 123 identifies and selects the audio sample data inserted into the L channel audio sample field 14 and the audio sample data inserted into the R channel audio sample field 16, based on the values stored in the channel field 11, the beginning bit 12 and the ignore bit 13, or the values stored in the L channel status field 15 and the R channel status field 17, and outputs the audio sample data to the audio processing circuit 124. The audio processing circuit 124 converts the inputted audio data into an analog audio signal by D/A conversion, and outputs the analog audio signal to the loudspeaker 125 to reproduce voice.

As described above, according to the present embodiment, the packet format of the audio data includes the channel field indicating the number of audio multi-channels, the ignore bit indicating whether or not an audio sample is present in a predetermined region of the packet format, the beginning bit indicating whether or not the audio sample is the beginning frame compliant with the IEC60958 Standard, the L channel audio sample field for transmitting the audio sample, the L channel status field for transmitting status information compliant with the IEC60958 Standard and related to the L channel audio sample field, the R channel audio sample field for transmitting the audio sample, and the R channel status field for transmitting status information compliant with the IEC60958 Standard and related to the R channel audio sample field. The payload in the packet format includes a repetition of a 64-bit audio frame by which two-channel digital audio data can be transmitted. In addition, the size of the audio frame is set to the natural number fraction of 128 bits or 64 bits, which is the unit of the encryption process. Therefore, it is possible to encrypt an audio data stream for multi-channels and transmit the encrypted audio data stream efficiently.

Modified Embodiment of First Embodiment

Figure 4:
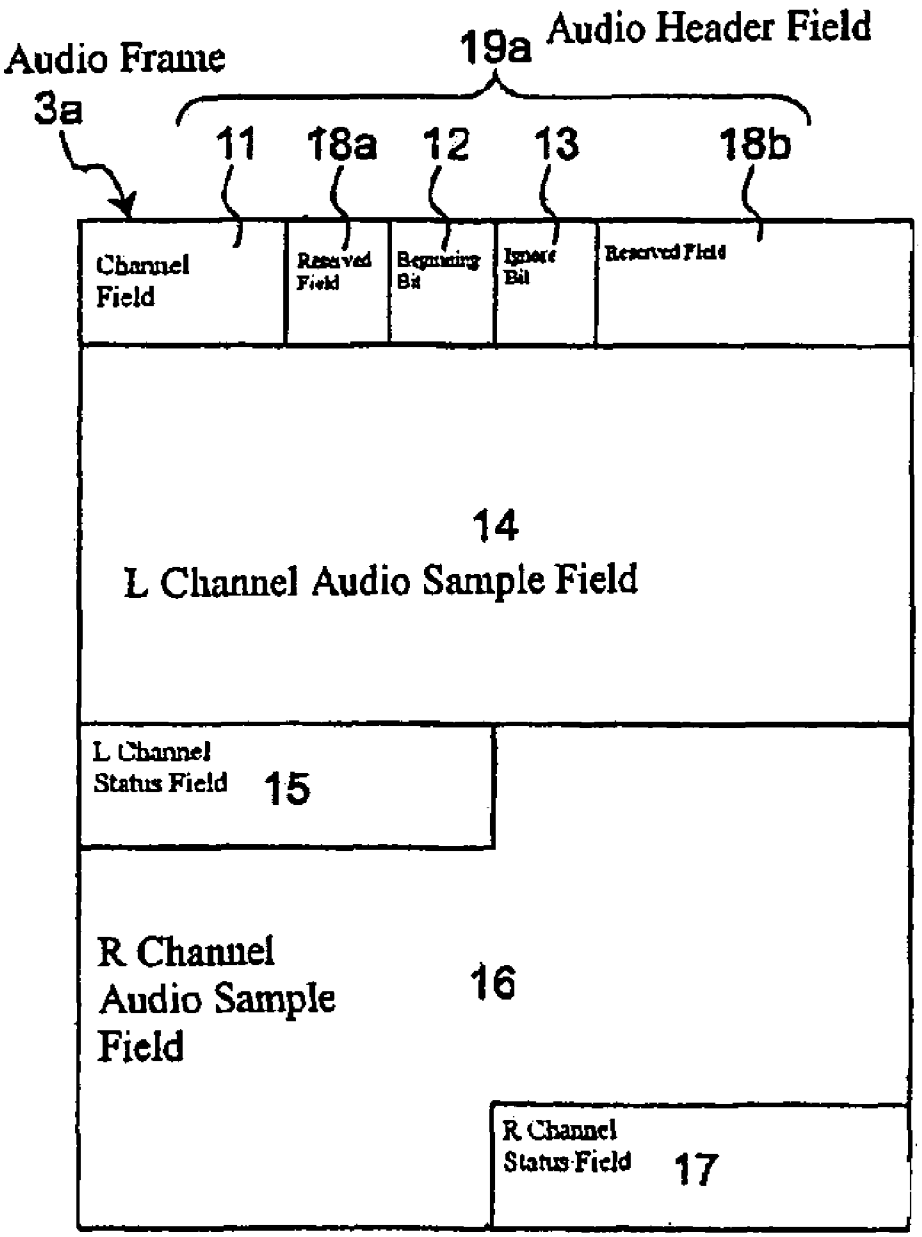
FIG. 4 is a diagram showing an audio frame format for use in a communication system according to a modified embodiment of the first embodiment.

A modified embodiment of the first embodiment of the present invention will be described below with reference to the drawings. FIG. 4 is a diagram showing an audio frame format for use in a communication system according to the modified embodiment of the first embodiment. The audio frame format for use in the modified embodiment of the first embodiment of FIG. 4 is different from the audio frame format for use in the first embodiment of FIG. 3 in that the reserved field 18 is divided into two reserved fields 18*a* and 18*b*, the reserved field 18*a* is arranged between the channel field 11 and the beginning bit 12, and the reserved field 18*b* is arranged next to the ignore bit 13. Since the other configurations are the same as those according to the first embodiment, operation will not be described herein.

Referring to FIG. 4, an audio frame 3*a* includes (a) the channel field 11 (2 bits) indicating the number of multi-channels of audio data to be transmitted, (b) the beginning bit 12 (1 bit) indicating whether or not an audio sample is the beginning frame compliant with the IEC60958 Standard, (c) the ignore bit 13 (1 bit) indicating whether or not the audio sample is present in a predetermined region of the frame format, (d) the L channel audio sample field 14 (24 bits), (e) the L channel status field 15 (4 bits) for transmitting status information compliant with the IEC60958 Standard and related to the L channel audio sample, (f) the R channel audio sample field 16 (24 bits), (g) the R channel status field 17 (4 bits) for transmitting status information compliant with the IEC 60958 and related to the R channel audio sample, (h) the reserved field 18*a* (1 bit), and (i) the reserved field 18*b* (3 bits).

In addition, the channel field 11, the beginning bit 12, the ignore bit 13, and the reserved fields 18*a* and 18*b* constitute an audio header field 19*a*.

In this case, the reserved field 18*b* may be used as an audio data contents identifier field indicating a type of audio contents in a manner similar to, for example, that of a fourth embodiment to be described later in detail. Further, numbers of bits of the reserved fields 18*a* and 18*b* and positions thereof in the audio header field 19*a* are not limited to those shown in FIG. 4. In addition, the reserved field 18 may be divided into a plurality of three or more reserved fields, and the reserved fields may be arranged at arbitrary positions in the audio header fields 19*a*, respectively.

The communication system and the packet format of audio data according to the modified embodiment of the first embodiment exhibit advantages effects similar to those of the communication system and the packet format of audio data according to the first embodiment.

Second Embodiment

Figure 5:
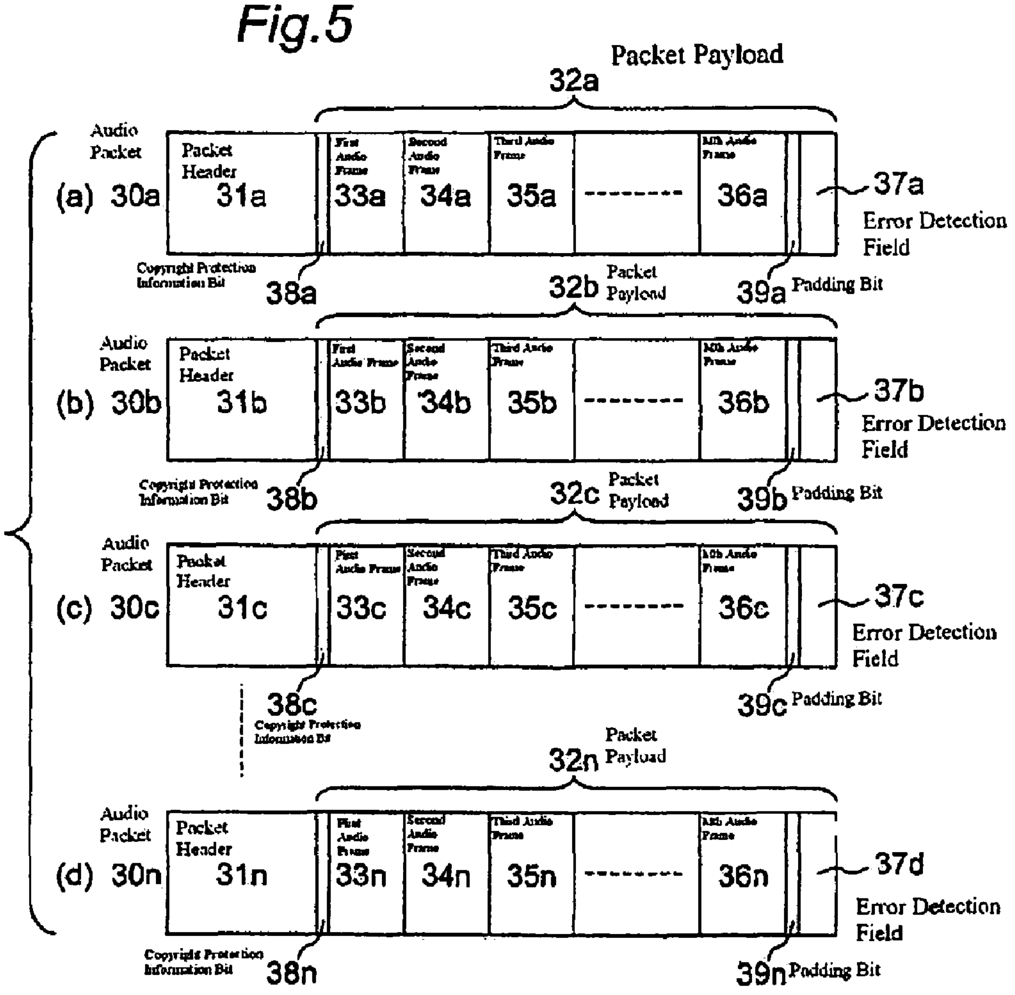
FIG. 5 is a diagram showing a packet format of audio data for use in a communication system according to a second embodiment of the present invention.

A second embodiment of the present invention will be described below with reference to the drawings. FIG. 5 is a diagram showing a packet format of audio data for use in a communication system according to the second embodiment of the present invention. The packet format of the audio data for use in the second embodiment is different from that according to the first embodiment of FIG. 2 in the following points. In FIG. 2, continuous packets are arranged so that positions of the beginning frames in the payloads 2 of the continuous packets are different from each other. However, such a case is excluded where an audio packet is retransmitted due to a transmission error. Since the other configurations are similar to those according to the first embodiment, operation will not be described herein.

In FIG. 5, reference symbols 30*a* to 30*n* denote first to n-th audio packets (where n is a natural number), respectively. In addition, reference symbols 31*a* to 31*n* denote packet headers, 32*a* to 32*n* denote packet payloads, and reference symbols 38*a* to 38*n* denote copyright protection information bits. Further, reference symbols 33*a* to 33*n* denote first audio frames, reference symbols 34*a* to 34*n* denote second audio frames, and reference symbols 35*a* to 35*n* denote third audio frames. In addition, reference symbols 36*a* to 36*n* are m-th (where m is a natural number) audio frames, reference symbols 39*a* to 39*n* denote padding bits, and reference symbols 37*a* to 37*n* denote error detection fields.

Transmission of an audio data signal using the packet format of the audio data configured as described above will be described below with reference to FIG. 5.

First of all, an operation performed by the source device 110 will be described. The packet processing circuit 113 of the source device 110 sequentially generates audio packets such as the first audio packet 30*a* to the n-th audio packet 30*n* of FIG. 5 in time series, based on the audio data stream inputted from the digital audio reproducing device 112. The packet transceiver circuit 114 sequentially transmits the first audio packet 30*a* to the n-th audio packet 30*n* to the sink device 120 via the wired transmission cable 100 in time series. In the present embodiment, the wired transmission cable 100 for a wired network is used. However, the present invention is not limited to this, and the source device 110 may be connected to the sink device 120 using a wireless communication link for a wireless network. When the source device 110 cannot correctly transmit the audio packets to the sink device 120 because of superimposition of disturbance noise or the like on the audio packets in the wired transmission cable, the source device 110 retransmits the audio packets by a predetermined retransmission procedure. The sink device 120 checks the error detection fields 37*a* to 37*n* of the respective audio packets 30*a* to 30*n*, and notifies the controller 111 of the source device 110 of information on whether or not a transmission error is present in each of the audio packets 30*a* to 30*n* by, for example, multiplexing the information with an acknowledge signal (also referred to as an acknowledgement signal or an ACK signal). For example, when the second audio packet 30*b* among the audio packets transmitted from the source device 110 to the sink device 120 is not correctly transmitted, data, which is the same as that of the packet payload of the second audio packet 30*b*, is set to the fourth audio packet 30*d*. Namely, a fourth L channel audio sample field, an L channel status field for transmitting status information compliant with the IEC60958 and related to the L channel audio sample field, an R channel audio sample field, and an R channel status field for transmitting status information compliant with the IEC60958 and related to the R channel audio sample field of the fourth audio packet 30*d* are set so as to be the same as those of the second audio packet 30*b*. In addition, a retransmission flag or the like is set to the header 31*d* of the fourth audio packet so that the fourth audio packet can be identified as a retransmitted packet. Numbers of the audio frames transmitted from the source device 110 to the sink device 120 will be organized below. In this case, "n" is the natural number and "m" is the natural number, and a notation similar to this is used below.

TABLE 7

| |
|---|
| When all of the audio packets are transmitted correctly, |
| First audio packet 30a = first to m-th audio frames; |
| Second audio packet 30b = (m + 1)-th to 2m-th audio frames; |
| Third audio packet 30c = (2m + 1)-th to 3m-th audio frames; |
| . . . ; |
| n-th audio packet 30n = ((n − 1)m + 1)-th to (n · m)-th audio frames; and |
| Audio packets similar to the above audio packets will follow. |

TABLE 8

| |
|---|
| When the second audio packet is not correctly transmitted, |
| First audio packet 30a = first to m-th audio frames; |
| Second audio packet 30b = (m + 1)-th to 2m-th audio frames; |
| Third audio packet 30c = (2m + 1)-th to 3m-th audio frames; |
| Fourth audio packet 30d = (m + 1)-th to 2m-th audio frames; |
| . . . ; |
| n-th audio packet 30n = ((n − 2)m + 1)-th to (n − 1)m-th audio frames; |
| (n + 1)-th audio packet 30n + 1 = ((n − 1)m + 1)-th to nm-th audio frames; and |
| Audio packets similar to the above audio packets will follow. |

Next, an operation performed by the sink device 120 will be described. Referring to FIG. 1, the packet transceiver circuit 122 sequentially receives the audio packets of FIG. 5 via the wired transmission cable 100, performs a signal process such as demodulation process on the audio packets, and thereafter, outputs the processed audio packets to the packet processing circuit 123. The packet processing circuit 123 temporarily stores the inputted audio packets in the built-in buffer, and performs a predetermined packet decoding process according to information on the MAC layer and the PHY layer included in the packet header 1. Thereafter, the packet processing circuit 123 identifies and selects the audio sample data inserted into the L channel audio sample field 14 and the audio sample data inserted into the R channel audio sample field 16, based on the values of the channel field 11, the beginning bit 12 and the ignore bit 13, or the values stored in the L channel status field 15 and the R channel status field 17, and outputs the audio sample data to the audio processing circuit 124. The audio processing circuit 124 converts the inputted audio sample data into an analog audio signal by D/A conversion, and outputs the analog audio signal to the loudspeaker 125. In this case, when the second packet 30*b* is an incorrect packet as described above, the packet processing circuit 123 discards the related packet payload 32*b*, and outputs the third audio packet 30*c* and the fourth audio packet 30*d* with changing an order of output of the third audio packet 30*c* and the fourth audio packet 30*d*. The packet processing circuit 123 identifies a value of the beginning bit 12 included in the header of each audio frame, and makes a determination of changing the order of output, so that the beginning bits 12 are active (beginning frame compliant with the IEC60958 Standard corresponding to audio frame) once every 192 cycle from the first audio packet 30*a*.

TABLE 9

| |
|---|
| First audio packet 30a = first to m-th audio frames; |
| Fourth audio packet 30d = (m + 1)-th to 2m-th audio frames; |
| Third audio packet 30c = (2m + 1)-th to 3m-th audio frames; |
| . . . ; |
| n-th audio packet 30n = ((n − 2)m + 1)-th to (n − 1)m-th audio frames; |
| (n + 1)-th audio packet 30n + 1 = ((n − 1)m + 1)-th to (n · m)-th audio frames; and |
| Audio packets similar to the above audio packets will follow. |

The packet processing circuit 113 of the source device 110 selects lengths of the packets so that the positions of the beginning frames in the payloads of the continuous audio packets are not the same as each other (lengths of the payloads of the packets are not natural number multiples of 192 frames). Therefore, an audio data reproducing unit can reproduce the audio data signals in a correct order, based on the inputted audio frames.

As described above, according to the present embodiment, the packet format of the audio data includes the channel field indicating the number of audio multi-channels, the ignore bit indicating whether or not an audio sample is present in a predetermined region of the packet format, the beginning bit indicating whether or not the audio sample is a beginning frame compliant with the IEC60958 Standard, the L channel audio sample field for transmitting the audio sample, the L channel status field for transmitting status information compliant with the IEC60958 Standard and related to the L channel audio sample field, the R channel audio sample field for transmitting the audio sample and the R channel status field for transmitting status information compliant with the IEC60958 Standard and related to the R channel audio sample field. The payload in the packet format includes a repetition of a 64-bit audio frame by which two-channel digital audio data can be transmitted. In addition, the size of the audio frame is set to the natural number fraction of 128 bits or 64 bits, which is the unit of the encryption process. In addition, the beginning frames in the payloads of the continuous audio packets are set so as not to be located at the same positions (lengths of the payloads of the packets are not natural number multiples of 192 frames). Therefore, it is possible to encrypt an audio data stream for multi-channels and transmit the encrypted audio data stream efficiently.

Third Embodiment

Figure 6:
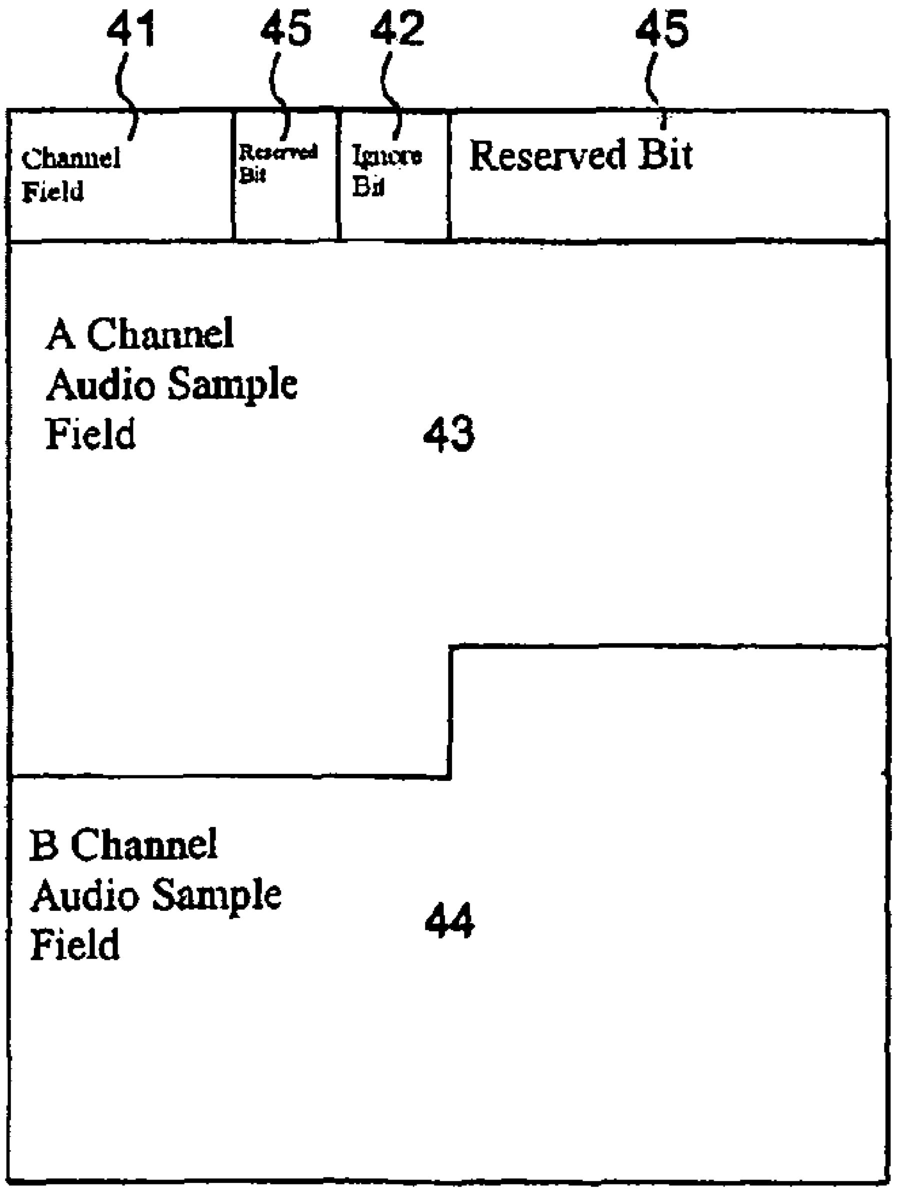
FIG. 6 is a diagram showing a packet format of audio data for use in a communication system according to a third embodiment of the present invention.

A third embodiment of the present invention will be described below with reference to the drawings. FIG. 6 is a diagram showing an audio frame format for use in a communication system according to the third embodiment of the present invention. The audio frame format according to the third embodiment of FIG. 6 is different from that according to the first embodiment of FIG. 3 in the following points.

(a) The beginning frame bit 12 compliant with the IEC60958 Standard is deleted.

(b) An A channel audio sample field is provided by combining the L channel audio sample field 14 and the L channel status field 15.

(c) A B channel audio sample field is provided by combining the R channel audio sample field 16 and the R channel status field 17.

Since the other configurations are the same as those according to the first embodiment, operation will not be described herein.

Referring to FIG. 6, the audio frame format includes a channel field 41 indicating the number of multi-channels, an ignore bit 42, an A channel audio sample field 43, a B channel audio sample field 44, and a reserved field 45.

Transmission of audio data using the packet format of the audio data configured as described above will be described with reference to FIGS. 1 and 6.

First of all, an operation performed by the source device 110 will first be described. Referring to FIG. 1, the digital audio reproducing device 112 reproduces a digital audio data stream from, for example, a recording medium, and outputs the reproduced digital audio data stream to the packet processing circuit 123. The packet processing circuit 123 temporarily stores the inputted audio data in a build-in buffer included therein, and generates the audio packet of FIG. 2. The audio packet includes the packet header 1 for storing therein information on the MAC layer and the PHY layer such as a destination address and a packet length, and the packet payload 2 for storing therein audio sample data or the like. The packet payload 2 includes the copyright protection information bit 5, the repetition pattern of the audio frames 3 (having a size of a natural number multiple of the size of the audio frame), and the padding bit 6. An error detection bit is set to the error detection field 4 so that errors of the packet payload 2 can be detected. As shown in FIG. 6, the audio frame according to the third embodiment includes the channel field 41 (2 bits) indicating the number of multi-channels of audio data to be transmitted, the ignore bit 42 (1 bit) indicating whether or not the audio sample is present in a predetermined region of the frame format, the A channel audio sample field 43 (28 bits), the B channel audio sample field 44 (28 bits), and the reserved fields 45 (each of 4 bit). The packet transceiver circuit 114 of the source device 110 transmits the audio packet generated by the packet processing circuit 113 to the sink device 120 via the wired transmission cable 100. In the present embodiment, the wired transmission cable 100 for a wired network is used. However, the present invention is not limited to this, and the source device 110 may be connected to the sink device 120 using a wireless communication link for a wireless network. In this case, the relationship among the channel field 41 indicating the number of multi-channels, the A channel audio sample field 43 and the B channel audio sample field 44 is similar to that according to the first embodiment. Further, the ignore bit 42 represents whether or not the audio sample is included in the B channel audio sample field 44. The ignore bit 42 enables such a case to be handled where no audio sample data is present in the last audio frame 3 in the packet payload 2 even when the number of multi-channels of the audio data to be transmitted is odd.

Next, an operation performed by the sink device 120 will be described. Referring to FIG. 1, the packet transceiver circuit 122 receives the audio data signal including the audio packet of FIG. 2 received via the wired transmission cable 100, performs a signal process such as demodulation process on the audio data signal, and thereafter, outputs the processed audio data signal to the packet processing circuit 123. The packet processing circuit 123 temporarily stores the inputted audio packet in a build-in buffer, and performs a predetermined packet decoding process according to the information on the MAC layer and the PHY layer included in the packet header 1. Thereafter, the packet processing circuit 123 identifies and selects the audio sample data inserted into the A channel audio sample field 43 and the audio sample data inserted into the B channel audio sample field 44, based on the values stored in the channel field 41 and the ignore bit 42 included in the header of the audio frame, and outputs the audio sample data to the audio processing circuit 124. The audio processing circuit 124 converts the inputted audio data into an analog audio signal by D/A conversion, and outputs the analog audio signal to the loudspeaker 125 to reproduce the audio signal.

As described above, according to the present embodiment, the packet format of the audio data includes the channel field indicating the number of audio multi-channels, the ignore bit indicating whether or not an audio sample is present in a predetermined region of the packet format, the A channel audio sample field for transmitting the audio sample, and the B channel audio sample field for transmitting the audio sample. The payload in the packet format includes a repetition of the audio frame. The payload in the packet format includes a repetition of a 64-bit audio frame by which two-channel digital audio data can be transmitted. In addition, the size of each audio frame is set to the natural number fraction of 128 bits or 64 bits, which is the unit of the encryption process. Therefore, it is possible to encrypt an audio data stream for multi-channels and transmit the encrypted audio data stream efficiently.

Fourth Embodiment

Figure 7:
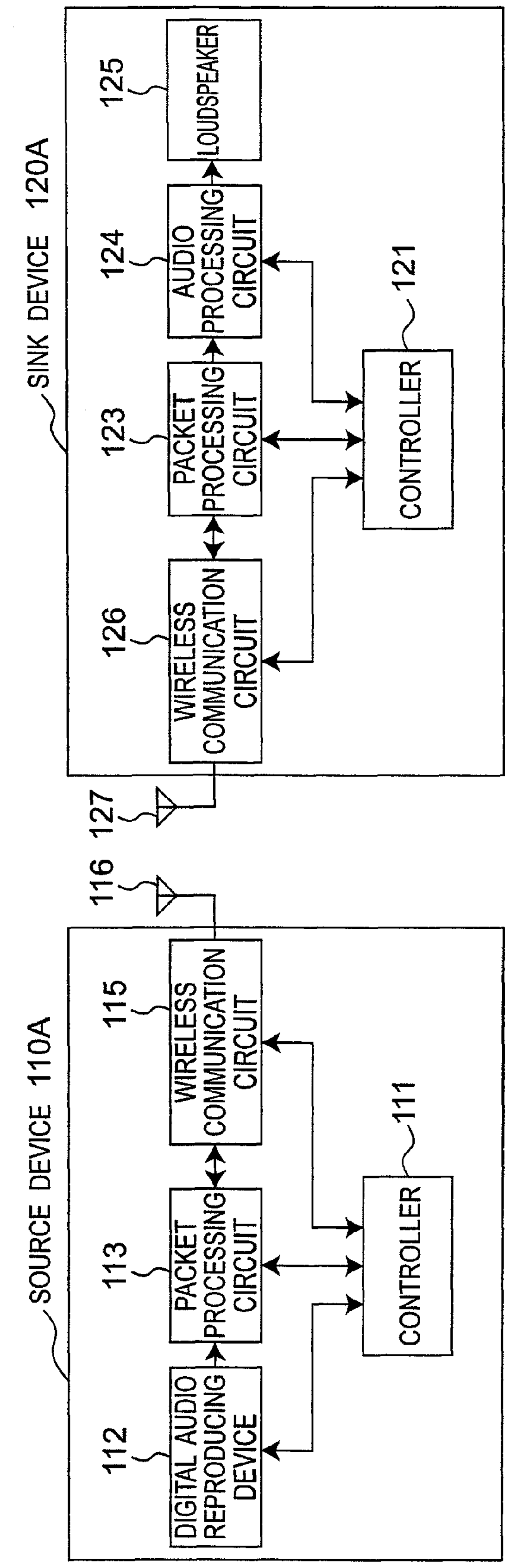
FIG. 7 is a block diagram showing a configuration of a wireless communication system for transmitting a packet signal of audio data using a packet format of audio data according to a fourth embodiment of the present invention.
Figure 25:
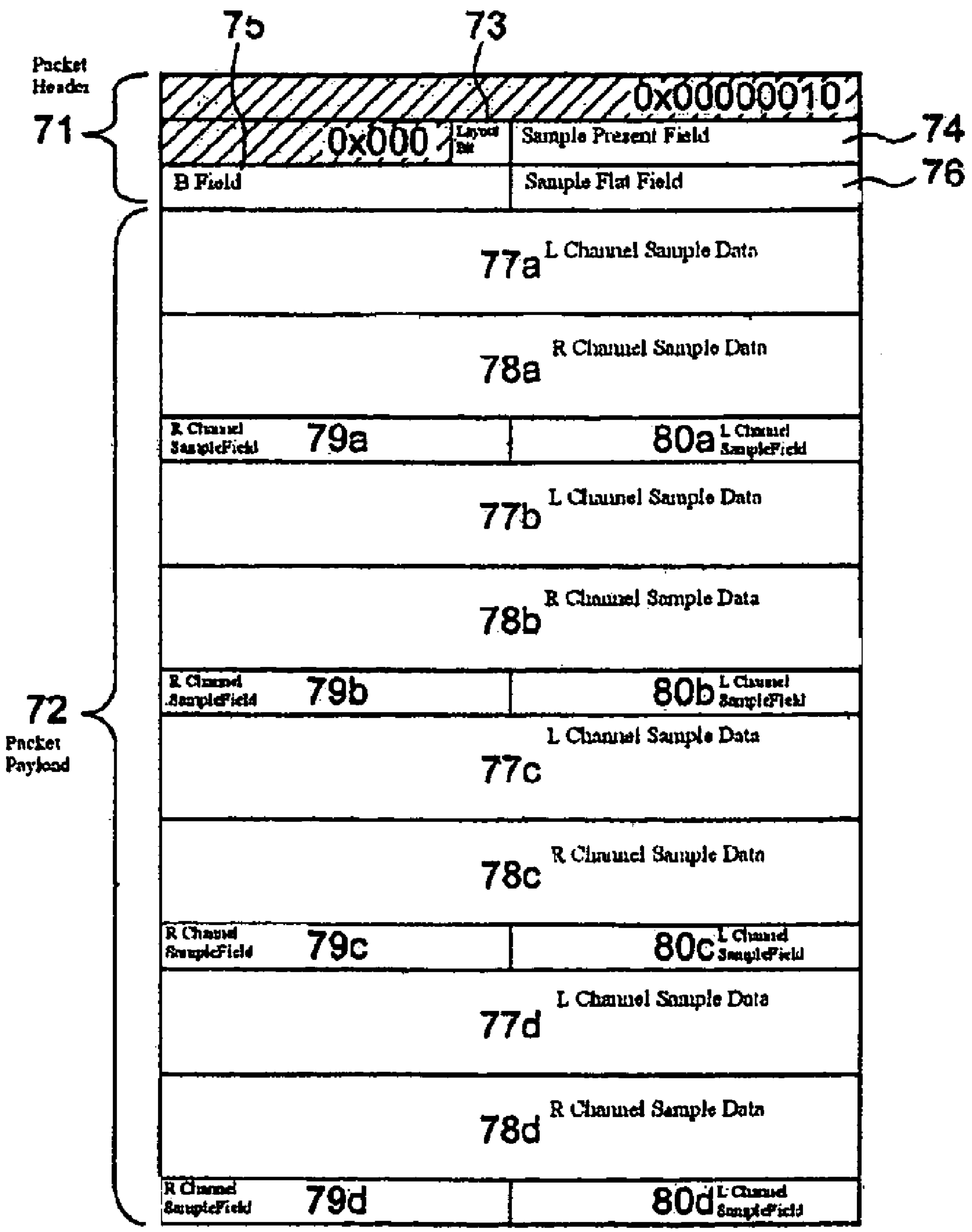
Fig.25 PRIOR ART
FIG. 25 is a diagram showing audio packet data for use in a communication system according to a prior art.

An audio frame format for use in a wireless communication system according to a fourth embodiment of the present invention will be described below with reference to the drawings. FIG. 7 is a block diagram showing a configuration of the wireless communication system for transmitting an audio data packet signal using the packet format of audio data according to the fourth embodiment of the present invention. It is to be noted that configurations of a source device 110A and a sink device 120A of FIG. 7 are applied to fourth and fifth embodiments below.

The audio frame format for use in the wireless communication system according to the fourth embodiment is characterized, as compared with that for use in the communication system according to each of the preceding embodiments and the modified embodiment, by further including an audio data contents identifier field indicating a type of audio contents.

First of all, referring to FIG. 7, the configuration and operation of the wireless communication system will be described. The wireless communication system includes the source device 110A and the sink device 120A connected to each other via a wireless communication link, and compliant with wireless HD (Wireless High-Definition). In the present embodiment, the wireless communication link is used. However, the present invention is not limited to this, and the source device 110A may be connected to the sink device 120A via the wired transmission cable 100 (See FIG. 1).

Referring to FIG. 7, the source device 110A and the sink device 120A generate and reproduce audio contents including audio data in a 16-bit linear pulse code modulation format having sampling frequencies of 32 kHz and 44.1 kHz or 48 kHz and a resolution of 16-bit per one sample. The source device 110A that functions as audio contents source device includes the digital audio reproducing device 112, the packet processing circuit 113, a wireless communication circuit 115 including an antenna 116, and the controller 111 controlling operations performed by these devices or circuits 112, 113 and 115. The digital audio reproducing device 112, which is a digital music player, for example, reproduces audio data from a recording medium such as a memory, an MD or a DVD, and outputs the reproduced audio data to the packet processing circuit 113. The packet processing circuit 113 converts the inputted audio data into a digital signal formed in a predetermined packet format, and outputs the digital signal to the wireless communication circuit 115. The wireless communication circuit 115 digitally modulates a carrier signal according to the inputted digital signal, and transmits a wireless signal after the modulation to a wireless communication circuit 126 of the sink device 120A via the antenna 116. A wireless signal transmitted from the sink device 120A is inputted to the wireless communication circuit 115 via the antenna 116, and the wireless communication circuit 115 demodulates the received wireless signal to a baseband signal, and outputs the baseband signal to the packet processing circuit 113. The packet processing circuit 113 extracts only predetermined control commands from the inputted baseband signal by a predetermined packet separation process, and outputs the predetermined control commands to the controller 111.

In addition, the sink device 120A includes the wireless communication circuit 126 including an antenna 127, the packet processing circuit 123, the audio processing circuit 124, the loudspeaker 125, and the controller 121 controlling operations performed by these circuits 123, 124 and 126 or the like. The wireless communication circuit 126 demodulates the received wireless signal received via the antenna 127 to a baseband signal, and outputs the baseband signal to the packet processing circuit 123. The packet processing circuit 123 extracts only audio data and the predetermined control commands from the inputted digital signal by a predetermined packet separation process. The packet processing circuit 123 outputs the former data to the audio processing circuit 124, and outputs the latter control command to the controller 121. The audio processing circuit 124 performs a predetermined signal process and a D/A conversion process on the inputted audio data and outputs the resultant audio signal to the loudspeaker 125 to output voice.

In the wireless communication system of FIG. 7, when the number of errors of the audio data signal received by the sink device 120A exceeds a predetermined threshold value, for example, the wireless communication circuit 126 transmits a control packet signal including an instruction command to instruct the source device 110A to retransmit an audio packet to the wireless communication circuit 115 of the source device 110A.

Referring to FIGS. 8 to 14, the packet format of the audio data for use in the wireless communication system of FIG. 7 will be described. FIGS. 8 to 24 referred to in the fourth and fifth embodiments are displayed with a least significant bit (lsb) and a least significant octet on the left, and a most significant bit (msb) and a most significant octet on the right. In addition, values of respective fields and bits are shown in hexadecimal notation.

In addition, in the fourth and fifth embodiments, the source device 110A wirelessly transmits the least significant bit of the least significant octet of each packet of the audio data first, and wirelessly transmits the most significant bit of the most significant of each packet of the audio data first octet last. Further, when transmitting the audio data, the source device 110A does not use an audio playback timestamp that is later in time than a sum of (a) its incoming playback timestamp and (b) the lesser of the maximum audio buffer size of the sink device 120A converted to time based on the audio format or a predetermined maximum audio buffer size.

The packet format of the audio data for use in the wireless communication system of FIG. 7 is the same as the packet format of the audio data of FIG. 2 for use in the communication system according to the first embodiment, and one packet includes the packet header 1 and the packet payload 2. In this case, the packet payload 2 includes the copyright protection information bit 5, the audio frames 3 (referred to as audio sub-packets hereinafter), the padding bit 6, and the error detection field 4.

Figure 8:
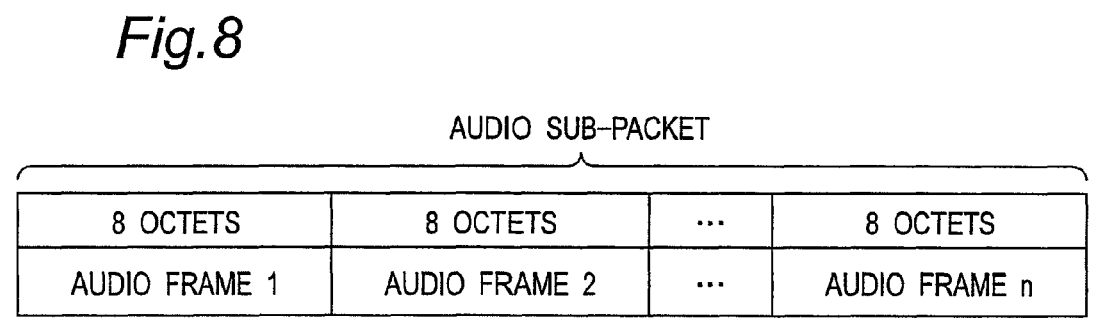

FIG. 8 is a diagram showing a configuration of each of the audio sub-packets in the packet payload in the packet of the audio data used in the wireless communication system of FIG. 7. As shown in FIG. 8, the audio sub-packet in the packet payload 2 includes a plurality of n audio frames 1, 2, . . . and n corresponding to the audio frames 3 of FIG. 2. In this case, a size of each audio frame is eight octets. In addition, the audio frames are transmitted in a group of audio frames including audio samples of channels with a same playback time. For example, if four channels are assigned to be active and allocated to the audio sub-packets, then the format of the audio sub-packet becomes as shown in FIG. 9. Namely, the audio frames 1, 3, 5, . . . and n include audio samples of the channels 0 and 1, and the audio frames 2, 4, 6, . . . and n−1 include audio samples of the channels 2 and 3.

FIG. 10 is a diagram showing a frame format of each of the audio frames of FIG. 8. As shown in FIG. 10, each audio frame includes an audio header field of 8 bits (corresponding to the audio header field 19 of FIG. 3), an L channel audio data field of 28 bits (corresponding to the L channel audio sample field 14 and the L channel status field 15 of FIG. 3), and an R channel audio data field of 28 bits (corresponding to the R channel audio sample field 16 and the R channel status field 17 of FIG. 3).

FIG. 11 is a diagram showing a format of the audio header field of FIG. 10. As shown in FIG. 11, the audio header field includes (a) a channel field indicating the number of multi-channels of audio data to be transmitted (2 bits; corresponding to the channel field 11 of FIG. 3), (b) a reserved bit (1 bit; corresponding to the reserved bit 18 of FIG. 8), (c) a beginning bit (1 bit; corresponding to the beginning bit 12 of FIG. 3) indicating whether or not an audio sample is the beginning frame compliant with the IEC60958 Standard, (d) an ignore bit (1 bit; corresponding to the ignore bit 13 of FIG. 3) indicating whether or not the audio sample is present in a predetermined region of the frame format, and (e) the audio data contents identifier field (3 bits) indicating the type of the audio contents.

Referring to FIG. 11, the channel field is set to identify audio channel numbers 0 to 7 of audio samples included in the audio frame including the channel field. Valid values for the channel field are 0x0, 0x1, 0x2 and 0x3. In this case, when the value of the channel field is set to 0x0, the audio frame including the channel field includes audio samples for the channels 0 and 1. When the value of the channel field is set to 0x1, the audio frame including the channel field includes audio samples for the channels 2 and 3. When the value of the channel field is set to 0x2, the audio frame including the channel field includes audio samples for the channels 4 and 5.

When the value of the channel field is set to 0x3, the audio frame including the channel field includes audio samples for the channels 6 and 7.

In addition, in FIG. 11, if the value of the audio data contents identifier field is set to 0x0, then the beginning bit is set to 1 when the audio frame including the audio contents identifier field is a first frame among 192 frames compliant with the IEC60958 Standard. In addition, if the value of the audio data contents identifier field is set to 0x1, then the beginning bit is set to zero. Further, if the value of the audio data contents identifier field is set to 0x2, then the beginning bit is set to 1 at every direct stream transport (DST) frame start.

Further, in FIG. 11, the ignore bit is set to 1 when the R channel audio sample field does not contain an audio sample, and channel 1, 3, 5 or 7 does not contain an audio sample.

Further, in FIG. 11, valid values for the audio data contents identifier field are 0x0 to 0x7. In this case, when a value of the audio data contents identifier field is set to 0x0, the type of the audio contents is IEC60958-1. When the value of the audio data contents identifier field is set to 0x1, the type of the audio contents is one bit audio. When the value of the audio data contents identifier field is set to 0x2, the type of the audio contents is DST audio. When the value of the audio data contents identifier field is set to one of 0x3 to 0x7, the type of the audio contents is reserved.

In addition, when the value of the audio data contents identifier field is set to 0x0, the L channel audio data field and the R channel audio data field of FIG. 10 have a format of FIG. 12. As shown in FIG. 12, the L channel audio data field includes an L channel audio sample field (24 bits) and an L channel status field (4 bits) for transmitting status information compliant with an IEC60956-1 Standard and related to L channel audio samples. In addition, the R channel audio data field includes an R channel audio sample field (24 bits) and an L channel status field (4 bits) for transmitting status information compliant with an IEC60956-1 Standard and related to R channel audio samples. In this case, the fields shown in FIG. 12 correspond to the fields 14 to 17 shown in FIG. 3, respectively. In addition, the value of the L channel audio sample field is set to the number of audio sample bits (little-endian) from a first sub-frame compliant with the IEC60958-1 Standard, and a value of the R channel audio sample field is set to the number of audio sample bits (little-endian) from a second sub-frame compliant with the IEC60958-1 Standard.

Further, the L channel status field of FIG. 12 has a format of FIG. 13. As shown in FIG. 13, the L channel status field includes a valid bit $V_L$ (1 bit) from the first sub-frame compliant with the IEC60958-1 Standard, a user data bit UL (1 bit) from the first sub-frame compliant with the IEC60958-1 Standard, a channel status bit CL (1 bit) from the first sub-frame compliant with the IEC60958-1 Standard, and a parity bit $P_L$ from the first sub-frame compliant with the IEC60958-1 Standard.

In addition, the R channel status field of FIG. 12 has a format of FIG. 14. As shown in FIG. 14, the R channel status field includes a valid bit $V_R$ (1 bit) from the second sub-frame compliant with the IEC60958-1 Standard, a user data bit $U_R$ (1 bit) from the second sub-frame compliant with the IEC60958-1 Standard, a channel status bit $C_R$ (1 bit) from the second sub-frame compliant with the IEC60958-1 Standard, and a parity bit $P_R$ from the second sub-frame compliant with the IEC60958-1 Standard.

As described above, according to the present embodiment, the packet format of the audio data includes the channel field indicating the number of audio multi-channels, the ignore bit indicating whether or not an audio sample is present in a predetermined region of the packet format, the beginning bit indicating whether or not the audio sample is the beginning frame compliant with the IEC60958 Standard, the L channel audio sample field for transmitting the audio sample, the L channel status field for transmitting status information compliant with the IEC60958-1 Standard and related to the L channel audio sample field, the R channel audio sample field for transmitting the audio sample, the R channel status field for transmitting status information compliant with the IEC60958-1 Standard and related to the R channel audio sample field, and the audio data contents identifier field indicating the type of the audio contents. The payload in the packet format includes a repetition of a 64 bit audio frame by which two-channel digital audio data can be transmitted. In addition, the size of the audio frame is set to the natural number fraction of 128 bits or 64 bits, which is the unit of the encryption process. Therefore, it is possible to encrypt an audio data stream for multi-channels and transmit the encrypted audio data stream efficiently.

Fifth Embodiment

A packet format of audio data for use in a wireless communication system according to a fifth embodiment of the present invention will be described below with reference to the drawings. The packet format of the audio data for use in the wireless communication system according to the fifth embodiment is characterized, as compared with the preceding embodiments and modified embodiment, by including a copyright protection information field 5*a* that includes information on copyright protection of audio contents instead of the 1-bit copyright protection information bits 5 and 38*a* to 38*n*.

FIG. 15 is a diagram showing the packet format of the audio data for use in the wireless communication system according to the fifth embodiment. As shown in FIG. 15, one audio packet includes the packet header 1 for storing therein (a) information on the MAC layer and the PHY layer such as a destination address and a packet length, and (b) a packet payload 2*a* for storing therein audio sample data or the like. In this case, the packet payload 2*a* includes the copyright protection field 5*a*, the repetition pattern of the audio frames 3 (a natural number multiple of audio frames), and the padding bit 6. The error detection field 4 is added to the tail of the packet payload 2*a*, subsequent to the end of the respective audio frames 3 and the padding bit 6. In this case, information on copyright protection of audio contents of the packet payload 2*a* is set to the copyright protection information field 5*a*. In addition, a length of the padding bit 6 is set so as to adjust a length of the packet payload 2*a* so that a total length of the copyright protection information bit 5*a* and the repetition pattern of the audio frames 3 is equal to a natural number multiple of an encryption process unit. An error detection bit is set to the error detection field 4 so that errors of the packet payload 2*a* can be detected.

FIG. 16 is a diagram showing a format of the copyright protection information field 5*a* of FIG. 15. As shown in FIG. 16, the copyright protection information field 5*a* includes a reserved bit (1 bit), a type bit (1 bit), a sequence number field (6 bits), and a data field (8 bit).

Referring to FIG. 16, the type bit has one of two valid values 0b0 and 0b1 (in the binary notation) each showing a type of packet data. When a value of the type bit is set to 0b0, the type of the packet data is an Audio content protection (ACP) packet compliant with an ACP Standard. When the value of the type bit is set to 0b1, the type of the packet data is an International Standard Recording Code (ISRC) packet compliant with an ISRC.

Referring to FIG. 16, a sequence number in the sequence number field is incremented for each audio sub-packet to create either an ACP packet or an ISRC packet. In this case, the sequence number ranges from 0x00 to 0x10 for the ACP packets, and ranges from 0x00 to 0x20 for the ISRC packets. In this case, a value of 0x00 indicates the first octet of the packet.

Further, in FIG. 16, the data field contains data of 1 octet in each of either the ACP packet or the ISRC packet. The data of 1 octet from every data field in the sub-packets is combined so that there is just one ACP packet or one ISRC packet for the audio stream.

FIG. 17 is a diagram showing a format of the ACP packet when the type bit of FIG. 16 indicates the ACP packet. As shown in FIG. 17, when the value of the sequence number field is set to 0x00, the contents of the data field are an ACP header field. When the value of the sequence number field is set to 0x01, the contents of the data field are data of octet 0. When the value of the sequence number field is set to 0x02, the contents of the data field are data of octet 1. When the value of the sequence number field is set to 0x03 to 0x0F, the contents of the data field is data of octet 2 to octet 14, respectively. When the value of the sequence number field is set to 0x10, the contents of the data field is data of octet 15.

In addition, the ACP header field of FIG. 17 defines audio types, and has valid values of 0x00 to 0x03. In this case, when the value of the ACP header field is set to 0x00, the audio type is Generic Audio. When the value of the ACP header field is set to 0x01, the audio type is IEC60958 identified Audio. When the value of the ACP header field is set to 0x02, the audio type is DVD Audio. When the value of the ACP header field is set to 0x03, the audio type is Super Audio CD. When the value of the ACP header field is set to one of 0x04 to 0xFF, the audio type is Reserved.

In this case, the source device 110A uses the ACP packet to transmit contents related information regarding the active audio stream. In addition, the source device 110A uses the ACP packet with the ACP header field of zero, when the source device 110A transmits the active audio stream with video sub-packets related to the audio sub-packets. Further, when the sink device 120A does not receive the ACP packet within 600 milliseconds, the sink device 120A reverts to the operation performed when the value of the ACP header field is zero. Whenever the source device 110A is required by other license agreements or specifications to transmits information related to the content protection requirements of the active audio stream, the source device 110A transmits the ACP packets at least once per 300 milliseconds and sets an appropriate value to the ACP header field. In addition, when the source device 110A is to transmit ACP packets, upon the start of a new audio stream or upon any change in the audio stream that can be indicated by the ACP packet, the source device 110A generates a modified, accurate ACP packet no later than 300 ms following the transmission of the affected or relevant audio sample.

FIG. 18 is a diagram showing a format of the data field of the ACP packet when the value of the ACP header field of FIG. 17 is set to 0x00, which indicates that the audio type is Generic Audio. As shown in FIG. 18, data of octet 0 includes a reserved bit (1 bit), a Retention move mode bit (lbit) in a Content Scramble System (CSS), a Retention state bit field (3 bits) in the CSS, an Encryption Plus Non-assertion (EPN) bit (1 bit), and a CCI (Copy Control Information) field (2 bits) for DTCP (Digital Transmission Content Protection). In addition, data of octet 1 to data of octet 15 are reserved fields (8 bits for each data).

FIG. 19 is a diagram showing the format of the data field of the ACP packet when the value of the ACP header field of FIG. 17 is set to 0x01, which indicates that the audio type is IEC60958 identified Audio. As shown in FIG. 19, data of octet 1 to data of octet 15 are reserved fields (8 bits for each data).

FIG. 20 is a diagram showing the format of the data field of the ACP packet when the value of the ACP header field of FIG. 17 is set to 0x02, which indicates that the audio type is DVD Audio. As shown in FIG. 20, data of octet 0 is a DVD audio type dependent generation field (8 bits). In addition, data of octet 1 includes a copy permission field (2 bits), a copy number field (3 bits), a quality field (2 bits), and a transaction field (1 bit). Further, data of octet 1 to data of octet 15 are reserved fields (8 bits for each data). In this case, the DVD audio type dependent generation field is used to identify the generation of the DVD Audio-specific ACP type dependent field, and is set to 1. It is to be noted that the reserved field of FIG. 20 may be used to transmit additional information. In this case, the value of the DVD audio type dependent field may be incremented. In addition, the copy permission field indicates an audio copy permission, the copy number field indicates the audio copy number parameter, the quality field indicates an audio quality parameter, and the transaction bit indicates an audio transaction parameter.

FIG. 21 is a diagram showing the format of the data field of the ACP packet when the value of the ACP header field of FIG. 17 is set to 0x03, which indicates that the audio type is Super Audio CD. As shown in FIG. 21, data of octet 0 to data of octet 15 are fields (8 bits for each field) indicating additional contents control information.

FIG. 22 is a diagram showing a format of the ISRC packet when the type bit of FIG. 16 indicates the ISRC packet. As shown in FIG. 22, when a value of the sequence number field is set to 0x00, the contents of the data field are an ISRC header field. When the value of the sequence number field is set to 0x01, the contents of the data field are data of octet 0. When the value of the sequence number field is set to 0x02, the contents of the data field are data of octet 1. When the value of the sequence number field is set to 0x03 to 0x1F, the contents of the data field are data of octet 2 to octet 30, respectively. When the value of the sequence number field is set to 0x10, the contents of the data field is data of octet 31. Using the ISRC packet, the source device 110A transmits relevant values of ISRC and/or UPC (Universal Product Code)/EAN (European Article Number) for describing an origin or owner details for each track of contents on a recording medium, such as a DVD, reproduced by the digital audio reproducing device 112.

FIG. 23 is a diagram showing a format of the ISRC header field of FIG. 22. As shown in FIG. 23, the ISRC header field includes a count bit (1 bit), a valid bit (1 bit), a reserved field (3 bits), and an ISRC status field (3 bits). In this case, the count bit of FIG. 23 indicates whether or not an ISRC packet including the count bit is continued in a next ISRC packet. In addition, the valid bit of FIG. 23 is set to 1 only when data located in the ISRC status field and data located in a UPC EAN ISRC xx field are valid.

When the source device 110A cannot obtain complete data for the ISRC status field and the UPC EAN ISRC xx field, the source device 110A sets the value of the valid field to zero. The ISRC status field indicates a status of the ISRC. The source device 110A sets the value of the ISRC status field as follows.

(1) At the beginning of each track, at least two complete UPC_EAN_ISRC codes are transmitted with the ISRC packet including the ISRC status field having a value of 0b001.

(2) During a bulk of a track, continuous repetitions of at least one packet are required, with the ISRC packet including the ISRC status field having a value of 0b001.

(3) Immediately before the end of each track, at least two complete UPC_EAN_ISRC codes are transmitted with the ISRC packet including the ISRC status field having a value of 0b11.

FIG. 24 is a diagram showing the format of the data field of the ISRC packet when the type bit of FIG. 16 indicates the ISRC packet. As shown in FIG. 24, data of octet 0 is a UPC_EAN_ISRC__0 field, data of octet 1 is a UPC_EAN_ISRC__1 field, and data of octet 2 to data of octet 31 are UPC_EAN_ISRC__2 field to a UPC_EAN_ISRC__31 field, respectively. In this case, a UPC_EAN_ISRC_n (where n=1, 2, . . . , 31) field is used for octet n of UPC/EAN or ISRC.

As described above, according to the present embodiment, the packet format of the audio data includes the channel field indicating the number of audio multi-channels, the ignore bit indicating whether or not an audio sample is present in a predetermined region of the packet format, the beginning bit indicating whether or not the audio sample is a beginning frame compliant with the IEC60958 Standard, the L channel audio sample field for transmitting the audio sample, the L channel status field for transmitting status information compliant with the IEC60958 Standard and related to the L channel audio sample field, the R channel audio sample field for transmitting the audio sample and the R channel status field for transmitting status information compliant with the IEC60958 Standard and related to the R channel audio sample field. The payload in the packet format includes a repetition of a 64-bit audio frame by which two-channel digital audio data can be transmitted. In addition, a size of the audio frame is set to the natural number fraction of 128 bits or 64 bits as an encryption process unit. Therefore, it is possible to encrypt an audio data stream for multi-channels and transmit the encrypted audio data stream efficiently. In addition, the payload of the packet efficiently includes the two bytes of copyright protection information field indicating information on the copyright protection of the audio contents. Therefore, the audio contents can be transmitted while protecting copyright of the audio contents.

In the first and second embodiments, the number of bits of the channel field indicating the number of multi-channels is three. However, the number of bits of the channel field may be four (16 channels) or more using the reserved bits.

In addition, if the payload 2 or 2*a* of the packet includes contents data for which copyright protection is unnecessary, the copyright protection information bit 5 and the copyright protection information field 5*a* may not be set. Further, in the first to fourth embodiments and the modified embodiment of the first embodiment, the copyright protection information field 5*a* instead of the copyright protection information bit 5 may be provided in the payload 2 of the packet. In this case, the padding bit 6 is set to adjust the length of the packet payload 2 so that a total length of the copyright protection information field 5*a* and the repetition pattern of the audio frames 3 is equal to a natural number multiple of the encryption process unit.

Further, in the second embodiment, if the second audio packet is not transmitted correctly, the fourth audio packet is the retransmitted packet. However, the retransmitted packet may be transmitted after the third audio packet.

Preferred embodiments according to the present invention will be described below with reference to the attached drawings. Components similar to each other are denoted by the same reference numerals and will not be described herein in detail.

As described above, the communication system and the packet format for audio data according to the present invention, the audio frame formed in the packet format of the audio data includes a channel field indicating a number of audio multi-channels, an ignore bit indicating whether or not an audio sample is present in a predetermined region of the packet format, a beginning bit indicating whether or not the audio sample is a beginning frame compliant with an IEC (International Electrotechnical Commission) 60958 Standard, an L channel audio sample field for transmitting the audio sample, an L channel status field for transmitting status information compliant with the IEC 60958 Standard and related to the L channel audio sample field, an R channel audio sample field for transmitting the audio sample, and an R channel status field for transmitting status information compliant with the IEC 60958 Standard and related to the R channel audio sample field. In addition, a payload of the packet includes a repetition of the audio frame. In addition, by configuring the audio frame so as to transmit digital audio data for two channels and setting the size of the audio frame to a natural number fraction of 128 bits or 64 bits, which is the unit of the encryption, it is possible to encrypt an audio data stream for multi-channels and transmit the encrypted audio data stream efficiently. The present invention can be particularly used for a packet format for transmitting audio contents.

In particular, the present invention can be used to transmit audio contents in a wireless communication system compliant with the wireless communication standard such as the WirelessHD (Wireless High-Definition).

What is claimed is:

1. A communication system comprising a transmitter for transmitting audio contents from a source device to a sink device using an audio packet formed in a predetermined packet format of audio data, which includes a plurality of audio samples for a plurality of channels, wherein the audio packet includes a variable-length payload including a repetition of a plurality of audio frames, wherein each respective audio frame of the plurality of audio frames of the variable-length payload includes:

(a) an L channel audio sample field for transmitting one of the plurality of audio samples;

(b) an L channel status field for transmitting status information compliant with an International Electrotechnical Commission (IEC) 60958 Standard and related to the L channel audio sample field;

(c) an R channel audio sample field for transmitting another one of the plurality of audio samples;

(d) an R channel status field for transmitting status information compliant with the IEC 60958 Standard and related to the R channel audio sample field;

(e) an ignore bit indicating whether or not the one or the another one of the plurality of audio samples is present in a predetermined region, which is one of the L channel audio sample field and the R channel audio sample field;

(f) a beginning bit indicating whether or not the respective audio frame is a beginning frame compliant with the IEC 60958 Standard; and (g) a channel field for transmitting a value identifying specific audio channel numbers for each audio sample of the plurality of audio samples transmitted using the R channel audio sample field and the L channel audio sample field.

2. A communication system comprising a transmitter for transmitting audio contents from a source device to a sink device using an audio packet formed in a predetermined packet format of audio data, which includes a plurality of audio samples for a plurality of channels, wherein the audio packet includes a variable-length payload including a repetition of a plurality of audio frames, wherein each respective audio frame of the plurality of audio frames of the variable-length payload includes:

(a) an A channel audio sample field for transmitting one of the plurality of audio samples;

(b) a B channel audio sample field for transmitting another one of the plurality of audio samples;

(c) an ignore bit indicating whether or not the one or the another one of the plurality of audio samples is present in a predetermined region, which is one of the A channel audio sample field and the B channel audio sample field; and (d) a channel field for transmitting a value identifying specific audio channel numbers for each audio sample of the plurality of audio samples transmitted using the A channel audio sample field and the B channel audio sample field.

3. The communication system according to claim 1, wherein each respective audio frame of the plurality of audio frames of the variable-length payload includes only one L channel audio sample field and only one R channel audio sample field.

4. The communication system according to claim 3, wherein the ignore bit of each respective audio frame of the plurality of audio frames of the variable-length payload only indicates whether or not the one or the another one of the plurality of audio samples is present in the predetermined region, which is one of the only one L channel audio sample field and the only one R channel audio sample field of the respective audio frame.

5. The communication system according to claim 1, wherein the audio packet includes a main header including information related to an MAC layer and a PHY layer.

* * * * *